(12) United States Patent
Hopwood et al.

(10) Patent No.: US 7,797,352 B1
(45) Date of Patent: Sep. 14, 2010

(54) COMMUNITY BASED DIGITAL CONTENT AUDITING AND STREAMING

(75) Inventors: Michael Hopwood, Jericho, VT (US); Peter F. Ullmann, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 386 days.

(21) Appl. No.: 11/820,586

(22) Filed: Jun. 19, 2007

(51) Int. Cl.
*G06F 7/00* (2006.01)
*G06F 17/00* (2006.01)

(52) U.S. Cl. ........................ 707/804; 707/812; 709/225

(58) Field of Classification Search ................ 707/1–10, 707/100–104.1, 200–206; 709/224, 225, 709/229; 726/2, 17; 705/51
See application file for complete search history.

(56) References Cited

U.S. PATENT DOCUMENTS

| | | | |
|---|---|---|---|
| 5,054,360 A | 10/1991 | Lisle et al. | |
| 5,883,804 A | 3/1999 | Christensen | |
| 6,523,069 B1 | 2/2003 | Luczycki et al. | |
| 6,553,412 B1 | 4/2003 | Kloba et al. | |
| 7,308,413 B1 | 12/2007 | Tota et al. | |
| 2002/0023058 A1* | 2/2002 | Taniguchi et al. | 705/57 |
| 2002/0033844 A1 | 3/2002 | Levy et al. | |
| 2002/0069218 A1 | 6/2002 | Sull et al. | |
| 2002/0092019 A1 | 7/2002 | Marcus | |
| 2002/0163532 A1 | 11/2002 | Thomas et al. | |
| 2003/0128880 A1 | 7/2003 | Akimoto et al. | |
| 2004/0128317 A1 | 7/2004 | Sull et al. | |
| 2005/0203927 A1 | 9/2005 | Sull et al. | |
| 2005/0283791 A1 | 12/2005 | McCarthy et al. | |
| 2005/0288991 A1 | 12/2005 | Hubbard et al. | |
| 2006/0059526 A1 | 3/2006 | Poslinski | |
| 2006/0092282 A1 | 5/2006 | Herley et al. | |
| 2007/0038931 A1 | 2/2007 | Allaire et al. | |
| 2007/0106660 A1 | 5/2007 | Stern et al. | |
| 2007/0214485 A1 | 9/2007 | Bodin et al. | |

FOREIGN PATENT DOCUMENTS

WO  WO 2005/252217 A1 *  3/2005
WO  WO 2005025217 A1     3/2005

OTHER PUBLICATIONS

Minerva Yeung et al., Extracting story units from long programs for video browsing and navigation, Jun. 17-23, 1996, IEEE, 296-305.*

(Continued)

*Primary Examiner*—Jean B Fleurantin
(74) *Attorney, Agent, or Firm*—Schwegman Lundberg & Woessner, P.A.

(57) ABSTRACT

In one embodiment, a system and method is illustrated and includes receiving auditing data relating to a piece of digital content, associating the auditing data with the piece of digital content to create audited digital content, receiving a content request pertaining to the audited digital content from a requester, checking a permission associated with the audited digital content, the permission to determine an exchange basis upon which the audited digital content is provided to the requester, and where the exchange basis defines the condition upon which the audited digital content may be accessed, and providing the audited digital content to the requester according to the exchange basis.

14 Claims, 19 Drawing Sheets

OTHER PUBLICATIONS

O'Connor et al., News story segmentation in the Fischlar video indexing system, 2001, IEEE, vol. 3, 418-421.*

"U.S. Appl. No. 11/444,642 Non Final Office Action Mailed Aug. 18, 2009", 12 pgs.

"U.S. Appl. No. 11/669,002, Final Office Action mailed Jul. 9, 2009", 20 pgs.

"U.S. Appl. No. 11/669,002, Non-Final Office Action mailed Jan. 23, 2009", 17 pgs.

"U.S. Appl. No. 11/669,002, Response filed Apr. 21, 2009 to Non Final Office Action mailed Jan. 23, 2009", 11 pgs.

Girgensohn, A., et al., "Facilitating Video Access by Visualizing Automatic Analysis", *Human-Computer Interaction INTERACT '99, IOS Press*, (1999),205-212.

Lee, Hyowon, "The Fischlar Digital Video Recording, Analysis and Browsing System", *Proceedings of RIAO '2000: ContentBased Multimedia Information Access*, Paris, France., (Apr. 12-14, 2000),1-10.

"Get Comments Quickly With Clip Notes", [online]. (c) Adobe Systems Incorporated, 2006. [created Jan. 17, 2006]. Retrieved from the Internet: <URL: http://www.adobe.com/designcenter/premiere/articles/prp2it_clipnotes/prp2it_clipnotes.pdf>,(2006),3 pgs.

"How to create and use Flash video metadata to add cue-points with flvtool2", [online]. [archived on Dec. 8, 2006; retrieved on Jan. 6, 2007]. Retrieved from the Internet: <URL: http://www.ioncannon.net/web-design/109/metadata-cuepointflash-video-flvtool/,6 pgs.

"The Vote Average for Film X Should be Y! Why Are You Displaying Another Rating?", [online]. (c) 1990-2006, Internet Movie Database, Inc. [retrieved on Apr. 27, 2006]. Retrieved from the Internet: <URL: http://msn-uk.imdb.com/help/show_leaf?voteaverage>,2 pgs.

Moorer, J. A., "The Digital Audio Processing Station: a New Concept in Audio Postproduction", *The Droid Works*, San Rafael, CA 94912. (Jun. 1986),10 pgs.

Smith, Julius O., "Unit Generator Implementation on the Next DSP Chip", *Proceedings of the International Computer Music Conference, 1989*,303-306.

"U.S. Appl. No. 11/444,642, Response filed Nov. 13, 2009 to Non Final Office Action mailed Aug. 18, 2009", 19 pgs.

"U.S. Appl. No. 11/669,002, Response filed Dec. 9, 2009 to Final Office Action mailed Jul. 9, 2009", 10 pgs.

"U.S. Appl. No. 11/713,959 SIDS", 4 pages.

* cited by examiner

MAKE A RECORD

EMAIL
○ 701

EMAIL ADDRESS OF RECIPIENT
702
[          ]

UPLOAD AUDITED CONTENT TO
COMMUNITY CONTENT SERVER
● 703

PERMISSIONS 704

RATE  SEGMENT  SELL
☑      ☑         ☐

CONTENT TYPE 705
AUDIO/
VIDEO  AUDIO  RSS  SLIDES
☑      ☐      ☐     ☐

NAME OF RECORD
AUTHOR
[ SPIELBERG ] 706

TITLE OF
DIGITAL CONTENT
[ JAWS ] 707

DURATION OF DIGITAL
CONTENT RANGE
IN MINUTES
[ 0-27; 26-77; 76-124 ] 708

RATING OF EACH PERIOD
OF DURATION
[ 7; 6; 10 ] 709

[ MAKE A RECORD ] 710    [ CLEAR RECORD ] 711

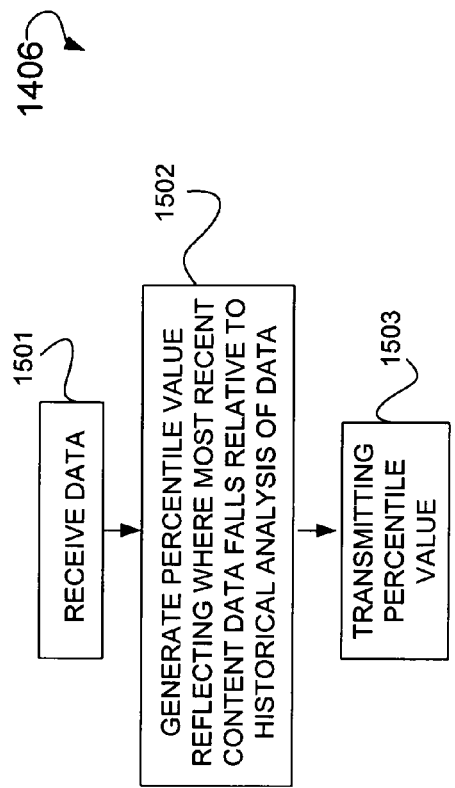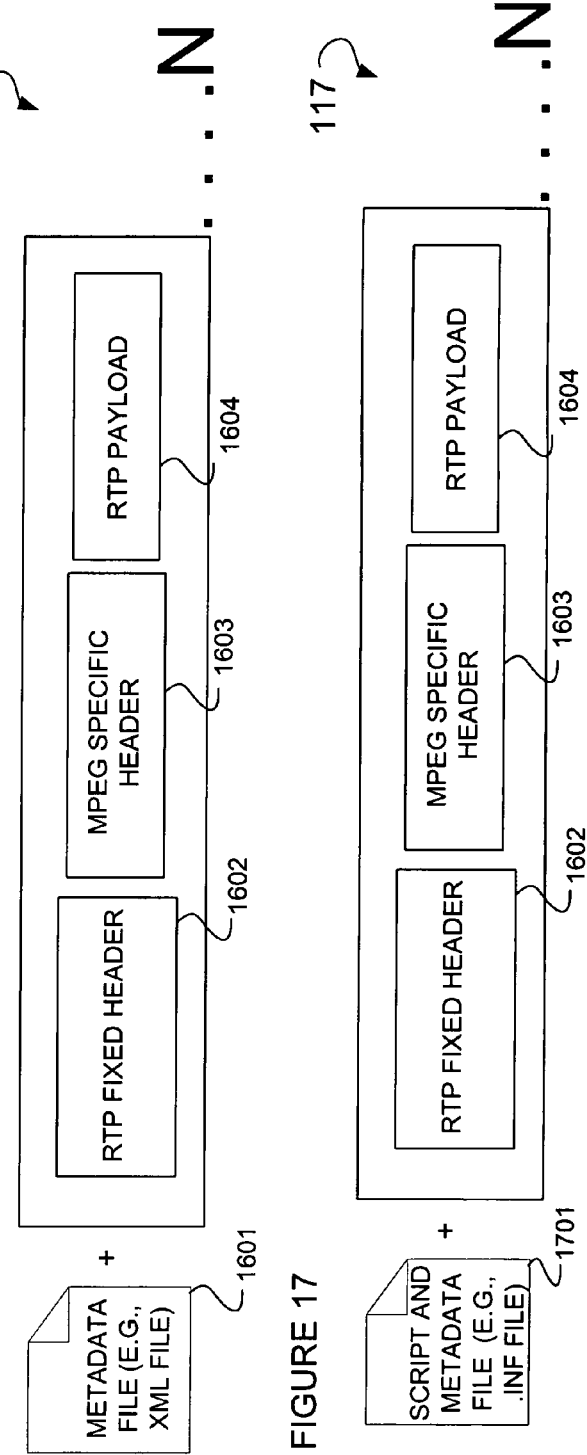

COMMUNITY BASED DIGITAL CONTENT AUDITING AND STREAMING

CROSS REFERENCE TO RELATED APPLICATIONS

This is a non-provisional patent application that is related to United States Patent Application titled: "AGGREGATING CHARACTERISTIC INFORMATION FOR DIGITAL CONTENT" (application Ser. No. 11/444,642), United States Patent Application titled: "AUTOMATIC VIDEO HIGHLIGHTS USING A RATING SYSTEM" (application Ser. No. 11/669,002), and United States Patent Application titled: "VIDEO HIGHLIGHTS FOR STREAMING MEDIA" (application Ser. No. 11/724,871), all of which are incorporated by reference in their entirety.

COPYRIGHT

A portion of the disclosure of this document contains material that is subject to copyright protection. The copyright owner has no objection to the facsimile reproduction by anyone in the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2007, Adobe Systems Incorporated. All Rights Reserved.

TECHNICAL FIELD

The present application relates generally to the technical field of algorithms and programming and, in one specific example, to the auditing of digital content and the setting of permissions for this digital content.

BACKGROUND

People may view digital content distributed across networks through any one of a number of means. Some websites display digital content in the form of audio and/or video content to anyone willing to download or otherwise access this digital content. In some cases, this content is placed on a website by ordinary persons, with little or no training in techniques used to generate digital content such as movies and the like. In other cases, individuals with such training may place their digital content onto a web site. This digital content may be placed even though there are copyrights or other legal protections associated with this digital content.

BRIEF DESCRIPTION OF THE DRAWINGS

Some embodiments are illustrated by way of example and not limitation in the figures of the accompanying drawings in which:

FIG. 7 is an example Graphical User Interface (GUI) used for making a record relating to a digital content upload, such as digital content upload, according to an example embodiment.

FIG. 15 is a flowchart illustrating a method used to execute an operation used to determine peak usage times or other information that may be germane for the purposes of monetizing, according to an example embodiment.

FIG. 16 is a diagram of an audited digital content file and the various portions of data that make up that file, according to an example embodiment.

FIG. 17 is a diagram of an audited digital content file that utilizes a script in addition to a metadata file, according to an example embodiment.

DETAILED DESCRIPTION

Figure 1:
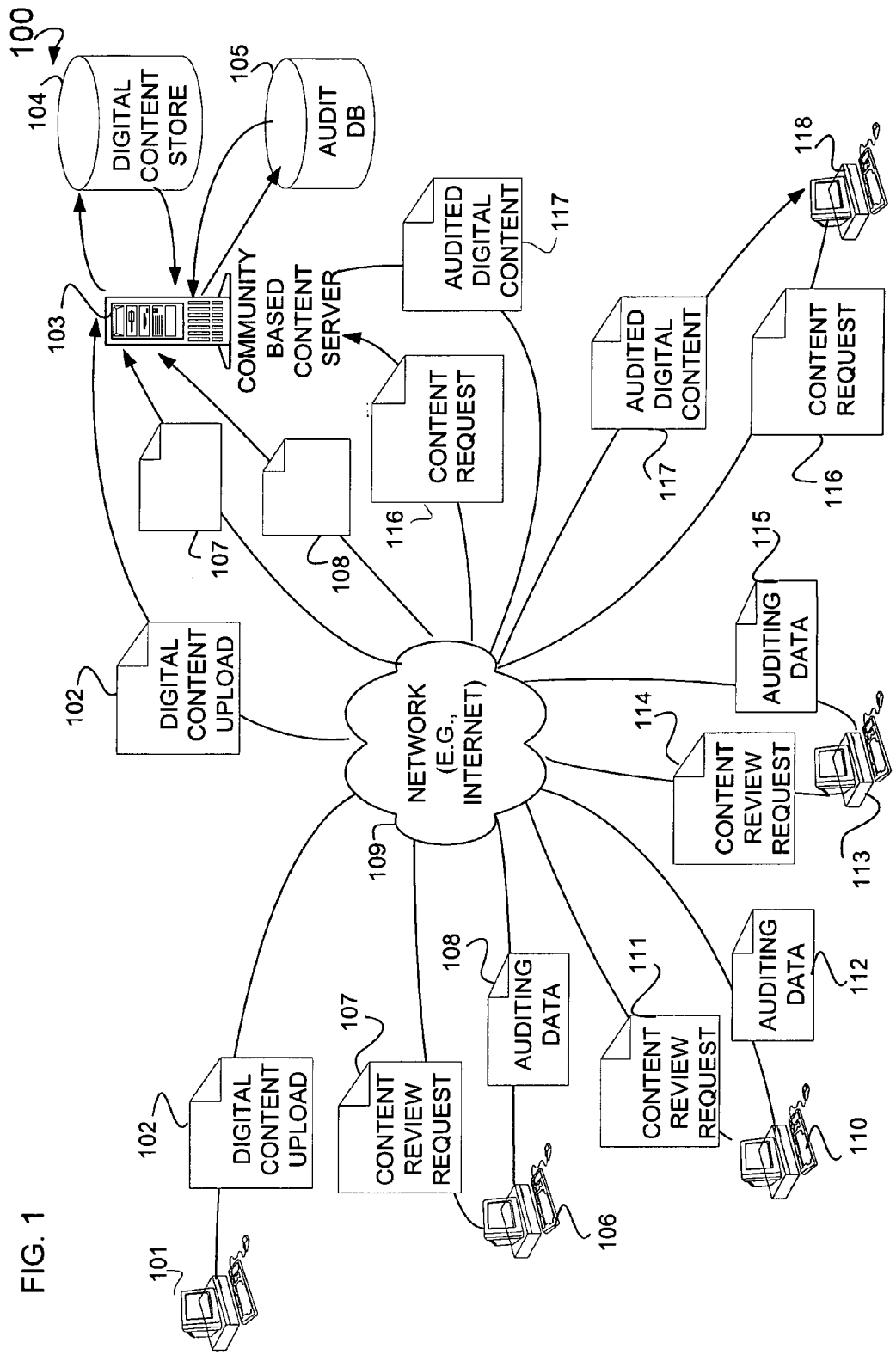
FIG. 1 is a diagram of a system for receiving audits of digital content and for providing digital content to member of a viewing community, according to an example embodiment.

In the following description, for purposes of explanation, numerous specific details are set forth in order to provide a thorough understanding of an embodiment of the present invention. It may be evident, however, to one skilled in the art that the present invention will be practiced without these specific details.

The leading digit(s) of reference numbers appearing in the Figures generally corresponds to the Figure number in which that component is first introduced, such that the same reference number is used throughout to refer to an identical component which appears in multiple figures. Signals and connections may be referred to by the same reference number or label, and the actual meaning will be clear from its use in the context of the description.

The distribution of digital content in the community content world is a well known phenomenon. Web sites such as YOUTUBE™ have allowed users (e.g., members of a viewing community and/or authors/owners of digital content) to distribute their digital content in ways not previously imagined. These websites, and the members of the viewing communities that supports them, provide for ways to allow users to state their likes or dislikes regarding particular pieces of digital content by, for example, tagging this content.

In some embodiments, a system and method is illustrated to allow users (e.g., both content authors/owners and content viewers) to identify, tag, monetize, and distribute highlights of digital content. This digital content may include, for example, video files, audio files, audio/video files, electronic documents, electronic slides, eXtensible Markup Language (XML) based data such as Really Simple Syndication (RSS) feeds, graphics files, or other suitable forms of digital content. This content may be posted within, for example, the previously referenced community content world. The system may allow viewers to mark sections of long form content (e.g., full length piece of digital content such as a movie, or song) through tagging them as piece of digital content (e.g., highlights). These highlights may then be made available to other viewers who can in turn add tags to rate them, or otherwise associate various permissions with them. Metadata may be associated with these highlights for the purpose of establishing these permissions. Further, in some embodiments, these highlights can be combined to create new collections of highlights that can in turn be selected, tagged, ordered, viewed, and/or again have permissions associated with them. Moreover, these highlights can be monetized by the content owners or authors based on a variety of parameters such as, for example, the number of times the highlight has been viewed, the rating associated with the highlight, and a number of other factors.

Owner/Authors and Viewers of Digital Content

With regard to the owner/authors of digital content, in some cases the system and method illustrated herein allows them to monetize the highlights rather than just the long form content. Further, the system and method shown herein allows these persons to use viewers as highlight creators, both reducing the cost of highlight creation and taking advantage of community based publicity for what is actually a highlight. Put another way, the system and method illustrated herein allows owner/authors of content to leverage many of the properties of community content world for economic gain.

As to viewers of this digital content, some embodiments of the system and method illustrated herein allow viewers to review highlights where otherwise these viewers would not have this option. Further, these viewers may be able to view these highlights without having to pay for the entire piece of digital content (e.g., without having to pay for the entire long form content). Additionally, viewers themselves may be empowered to generate highlights via, for example, tagging.

Some embodiments may include allowing online long form video viewers to select and tag segments of the long form content. This, in turn, allows the digital content owner/author to learn what aspects (e.g., highlights or pieces of digital content) of their content is more appealing to a particular community (e.g., the online community where their particular piece of digital content is posted). Further, the tagging may allow for an author/user to more easily access their content. In some embodiments, however, this tagging may be controlled by permissions set by the digital content owner/author such that the owner/author may control the tagging activities of viewers.

Example embodiments may include the monetization of these highlights. For example, a flexible pricing model may be employed by the digital content owner/author based upon factors such as: whether these highlights are part of a pre-release versus a re-run, the title, the actors (e.g., the popularity of one actor versus another), what the highlight is used for, media factors (e.g., length of highlight, number of bits served, etc.), community factors (e.g., top rated), popularity, or type of highlight (e.g., video and audio, video only, audio only, etc.).

Use of Histograms

In some embodiments, the tags associated with a piece of digital content (e.g., tagging data) is aggregated such that a histogram may be generated reflecting this tagging data as, for example, audit data. A histogram may reflect user preferences regarding a piece of digital content over some predefined period of time. The audit data contained in the histogram could, for example, include the number of times a piece of digital content was viewed by a user, the number times it was downloaded, the number times it was recommended to third parties, a rating value for the digital content or segments thereof, or some other suitable type of audit data. Through generating this histogram, a monetary value could be associated with this digital content such that the higher the rating, the more valuable the digital content and the more costly to access.

Not only may entire pieces of digital content have an audit value attached to them, but segments of digital content might as well. For example, it may be the case that a particular guitar riff in a song may be fairly popular and noteworthy, such that people may listen to it very often. And again, it may be the case that a particular scene from a movie might be more popular than the entire movie itself. The audit values for this guitar riff or scene from a movie might be relatively high relative to the song that the guitar riff is from and the movie that the scene is from. That is, for example, a histogram tracking downloads of this guitar riff or movie scene might show a lot of downloads over a very short period of time denoting the popularity of the guitar riff or scene from the movie.

In some case, the ability to access an entire piece of digital content or a portion of this digital content for the purpose of providing data for a histogram may be based upon certain permissions associated with the digital content. For example, if one cannot download (e.g., does not have the permission to do so) a piece of digital content, then a histogram regarding downloading may not be generated. The author/owner of the digital content ultimately maintains control over what can be done with the highlights or even the long form versions of the digital content.

Example Systems

FIG. 1 is a diagram of an example system 100 for receiving audits of digital content and for providing digital content to a member of, for example, a viewing community. Illustrated is a computer system 101 that provides a digital content upload 102 across a network 109 to a community-based content server 103. As will be more fully described below, in some cases, this community-based content server 103 may be capable of capturing the markup and tags from viewers and delivering nonlinear highlight content from multiple content sources. Operatively coupled to this community-based content server 103 is, for example, a digital content store 104 that actually stores digital content. Further, an audit database 105 is illustrated that stores auditing data associated with the digital content.

Once this digital content is uploaded, then one or more users utilizing one more computer systems (e.g., 106, 110, 113, and 118) may make a content review request, and then provide auditing data regarding the digital content that is reviewed. For example, a user using a computer system 106 may make a content review request 107 and transmit this content review request 107 across a network 109 to the community-based content server 103. Once the content (e.g., digital content) is provided for viewing on the computer system 106, a user may be free to generate auditing data 108. This auditing data 108 may be, for example, data in the form of the recorded views or number of times a user views a particular piece of digital content, rating data, recommendation data, or other suitable types of data wherein the digital content is audited or reviewed in some manner. Similarly, a user utilizing a computer system 110 may provide a content review request 111 and then also generate auditing data 112. Further, a user utilizing a computer system 113 may make a content review request 114 and then subsequently provide auditing data 115.

In some cases, a user may want to actually retrieve a copy of the audited digital content. In such cases, a user utilizing a computer system 118 may make a content request 116. In response, the user utilizing the computer system 118 may be provided with audited digital content 117. The determination of whether the user utilizing the computer system 118 is actually eligible to be provided with the audited digital content 117 may be based upon certain permissions. These permissions may be permissions in the form of, for example, determining whether or not a particular user is barred from receiving the audited digital content 117, whether or not they can receive segments of the audited digital content 117, whether or not users may actually purchase the entirety of the audited digital content 117 or segments thereof. In certain cases, these purchases may be based upon, for example, the auditing data (e.g., 108, 112 or 115) and, more specifically, the number of times the digital content has been used, rated (e.g., the ratings value associated with the content), or some other suitable basis upon which to monetize the audited digital content 117. As will be more fully discussed below, the audited digital content 117 may be in the form of a metadata and an associated digital content file, or a media stream containing the metadata and a portion of the digital content file. This digital content file may contain highlights (e.g., a segment) of a piece of digital content or even the entire long form version of the digital content.

Figure 2:
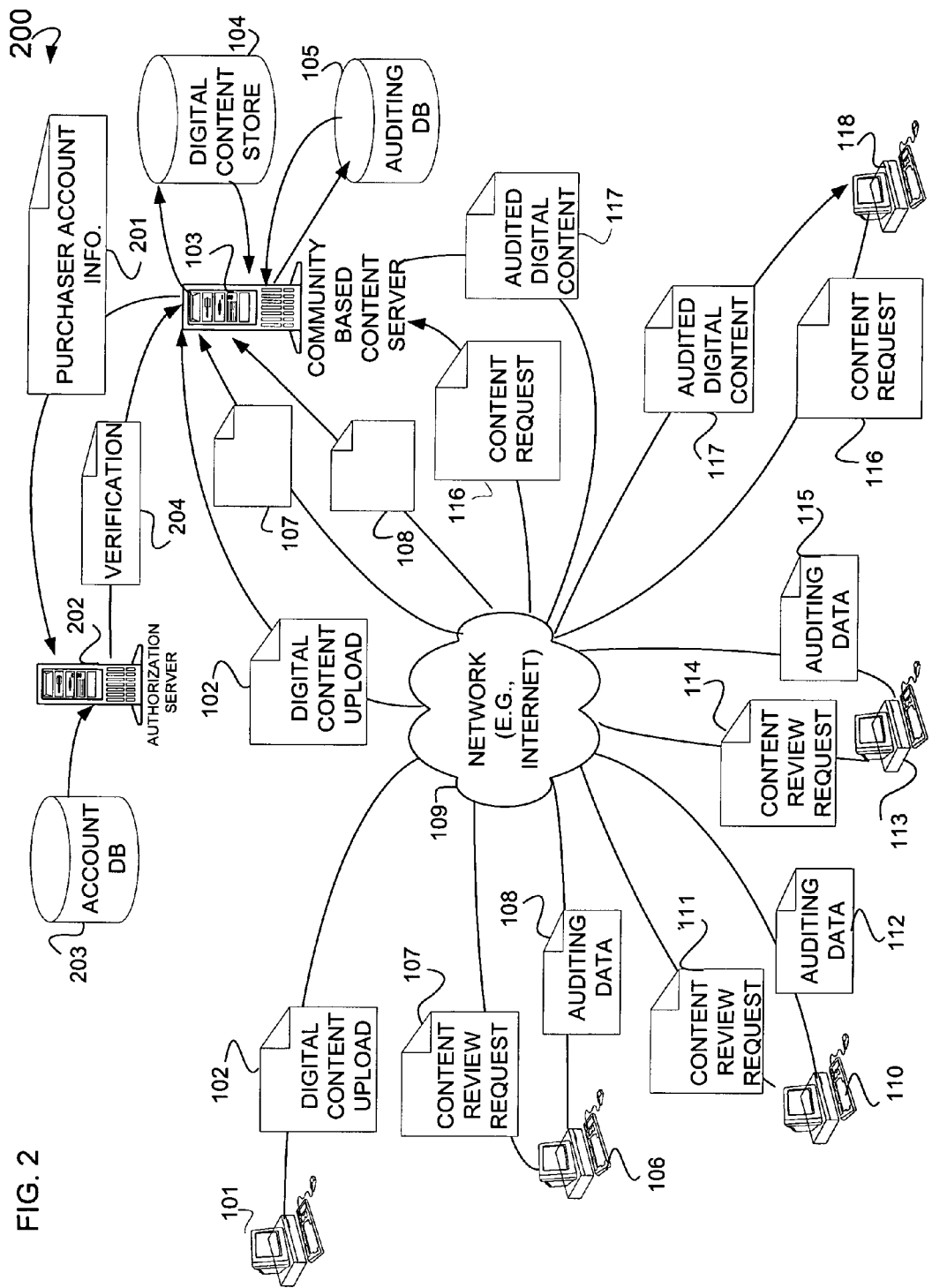
FIG. 2 is a diagram of a system for receiving audits of digital content and for providing digital content to member of a viewing community where the verification process is carried out by a separate computer systems, according to an example embodiment.

FIG. 2 is a diagram of an example system 200 for receiving audits of digital content and for providing digital content to member of a viewing community where the verification process is carried out by a separate computer system. In contrast to FIG. 1, illustrated here is a permissions determination structure and functionality that is separately carried out by an authorization server 202 as opposed to being carried out by the community-based content server 103. Illustrated is a purchase account information data packet 201 containing information relating to a particular user who has made a content request such as content request 116. This purchase account information data packet 201 is transmitted by the community-based content server 103 to an authorization server 202. This authorization server 202 may be operatively coupled to the community-based content server 103 via a network 109, or some other suitable network connection. Once the authorization server 202 receives the purchaser account information data packet 201, a determination is made regarding whether verification of the user making the content request 116 has taken place. In certain instances, account data may be retrieved from an account database 203 by the authorization server 202. In cases where the verification exists or even in cases where it does not exist, a verification packet 204 may be transmitted by the authorization server 202 to the community-based content server 103. This verification packet 204 may instruct the community-based content server 103 as to whether or not the audited digital content 117 should be provided to a user utilizing the computer system 118. In cases where verification has been successful (e.g., a user's credit is validated) the audited digital content 117 will be provided by the community-based content server 103 across the network 109 to the user utilizing the computer system 118.

Figure 3:
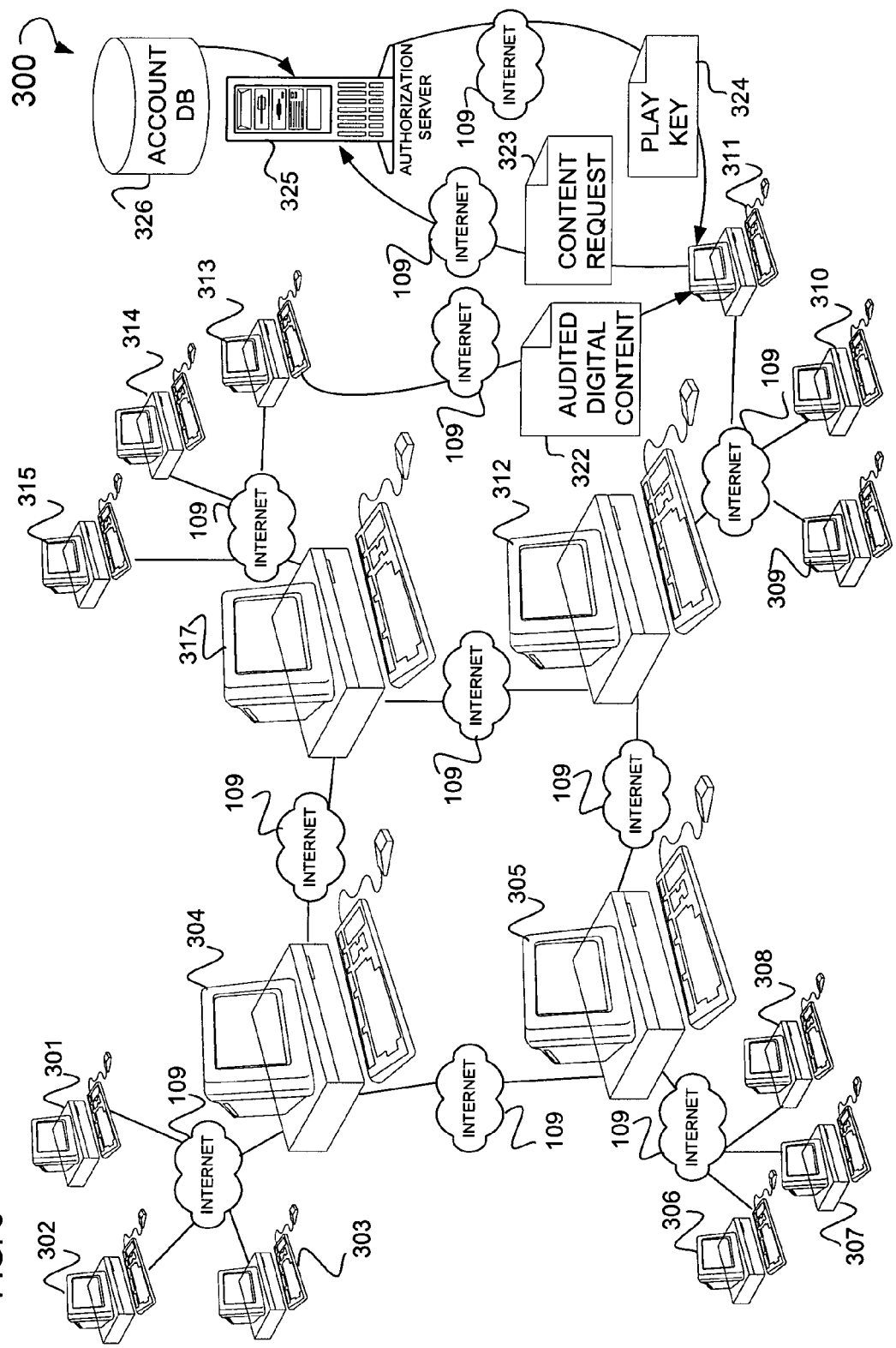
FIG. 3 is a diagram of a partially decentralized peer-to-peer system, wherein the file directory for this network is partially decentralized amongst a variety of group leader peers devices that manage a number of ordinary peer devices, according to an example embodiment.

FIG. 3 is a diagram of an example partially decentralized peer-to-peer system 300, wherein the file directory for this network is partially decentralized amongst a variety of group leader peer devices that manage a number of ordinary peer devices. Illustrated is a collection of group leader peer devices 304, 305, 312, and 317 that are operatively coupled via a network 107. Each of these group leader peer devices manages a number of ordinary peer devices across the same network 109, such that, for example, these ordinary peer devices are associated with a group leader peer device. For example, the group leader peer device 304 manages an ordinary peer device 303, 302, and 301. Similarly, the group leader peer device 317 manages an ordinary peer device 313, 314, and 315. Moreover, the group leader peer device 312 manages an ordinary peer device 309, 310, and 311. The group leader peer device 305 manages an ordinary peer device 306, 307, and 308. In certain cases, an ordinary peer device, such as ordinary peer device 311, may make a request for audited digital content such as audited digital content 322. This request may be made of another ordinary peer device or group leader peer device. Here, for example, ordinary peer device 311 makes a request of ordinary peer device 313 across the network 109 for audited digital content 322. Once the audited digital content 322 is received by the ordinary peer device 311, a content request 323 is sent by the ordinary peer device 311 across the network 109 to an authorization server 325. This authorization server 325 may have an account database 326 containing information relating to the permissions associated with the particular piece of audited digital content 322. In certain cases where the permissions exist to do so, a play key 324 may be provided across the network 109 to the ordinary peer device 311 by the authorization server 325. This play key 324 may be a symmetric or asymmetric encryption key that may be used to decrypt the audited digital content 322 for playing by an application residing on the ordinary peer device 311. In certain cases, as will be more fully described below, the audited digital content 322 may contain a metadata file describing, for example, the URL or Uniform Resource Locator address and/or IP address (e.g., an Internet Protocol address) for the authorization server 325, or some other suitable server that may allow for a determination to be made of whether or not a permission exists such that the ordinary peer device 311 may be able to view the audited digital content 322.

Figure 4:
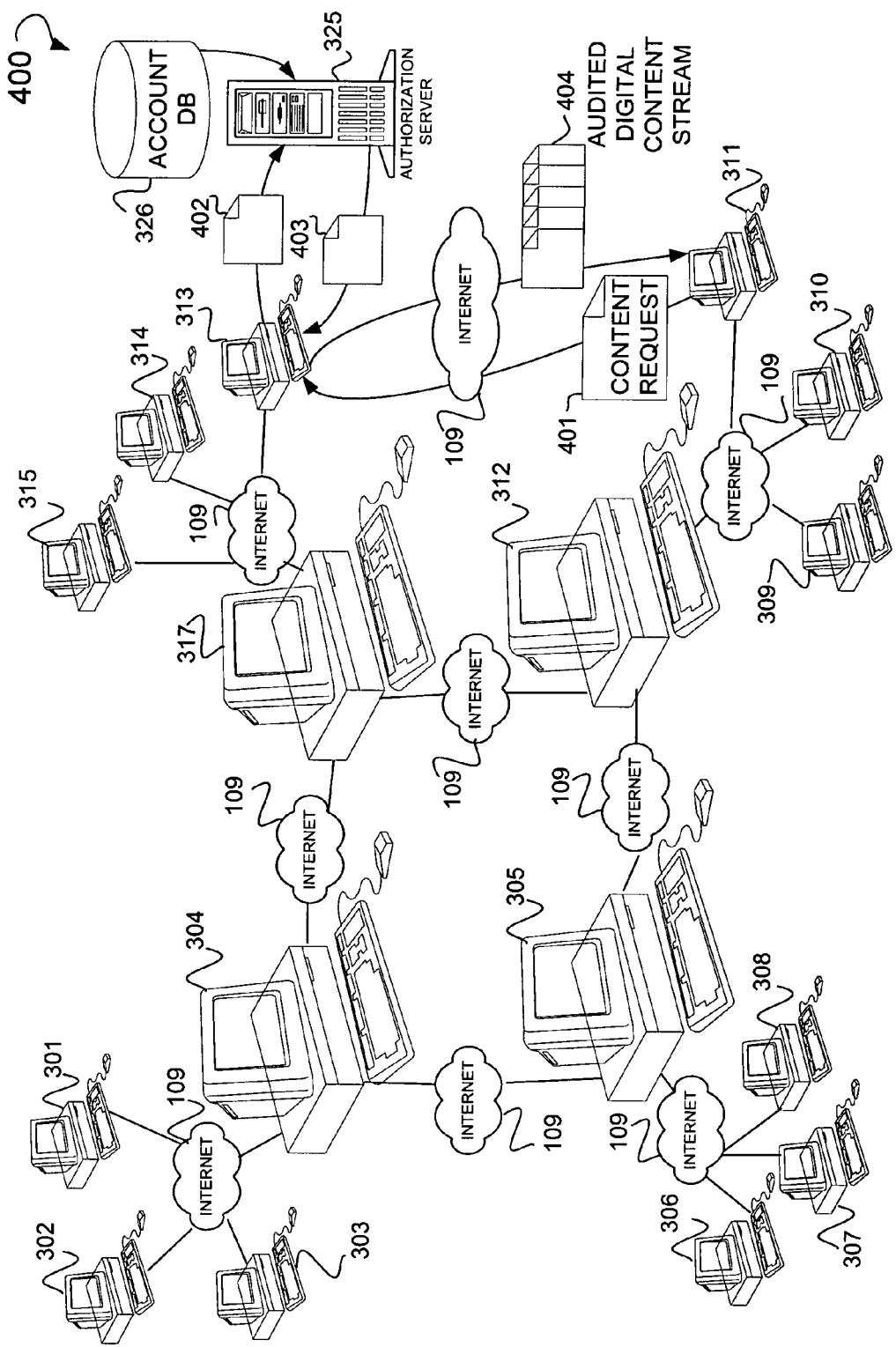
FIG. 4 is a diagram of a peer-to-peer system utilizing a decentralized file directory wherein the authorization process takes place through a first ordinary peer device serving as a mediator between a second ordinary peer device and an authorization server, according to an example embodiment.

FIG. 4 is a diagram of an example peer-to-peer system 400 utilizing a decentralized file directory wherein the authorization process takes place through a first ordinary peer device serving as a mediator between a second ordinary peer device and an authorization server. Illustrated is a first ordinary peer device 311 that generates a content request 401 that is transmitted across a network 109 to a second ordinary peer device 313. When the ordinary peer device 313 receives the content request 401, an authorization request 402 is made of the authorization server 325. An authorization reply 403 is then generated by the authorization server 325 in cases where permissions exist for the ordinary peer device 311 to utilize a particular piece of audited digital content or an audited digital content stream. Once authorization takes place and the ordinary peer device 311 is deemed to have the permission to utilize the audited digital content, the audited digital content may be transmitted by the ordinary peer device 313 across the network 109 as an audited digital content stream 404 being sent to the ordinary peer device 311. In other cases, a complete file may be sent in lieu of an audited digital content stream 404, the completed file being sent by the ordinary peer 313 across the network 109 to the ordinary peer device 311.

Figure 5:
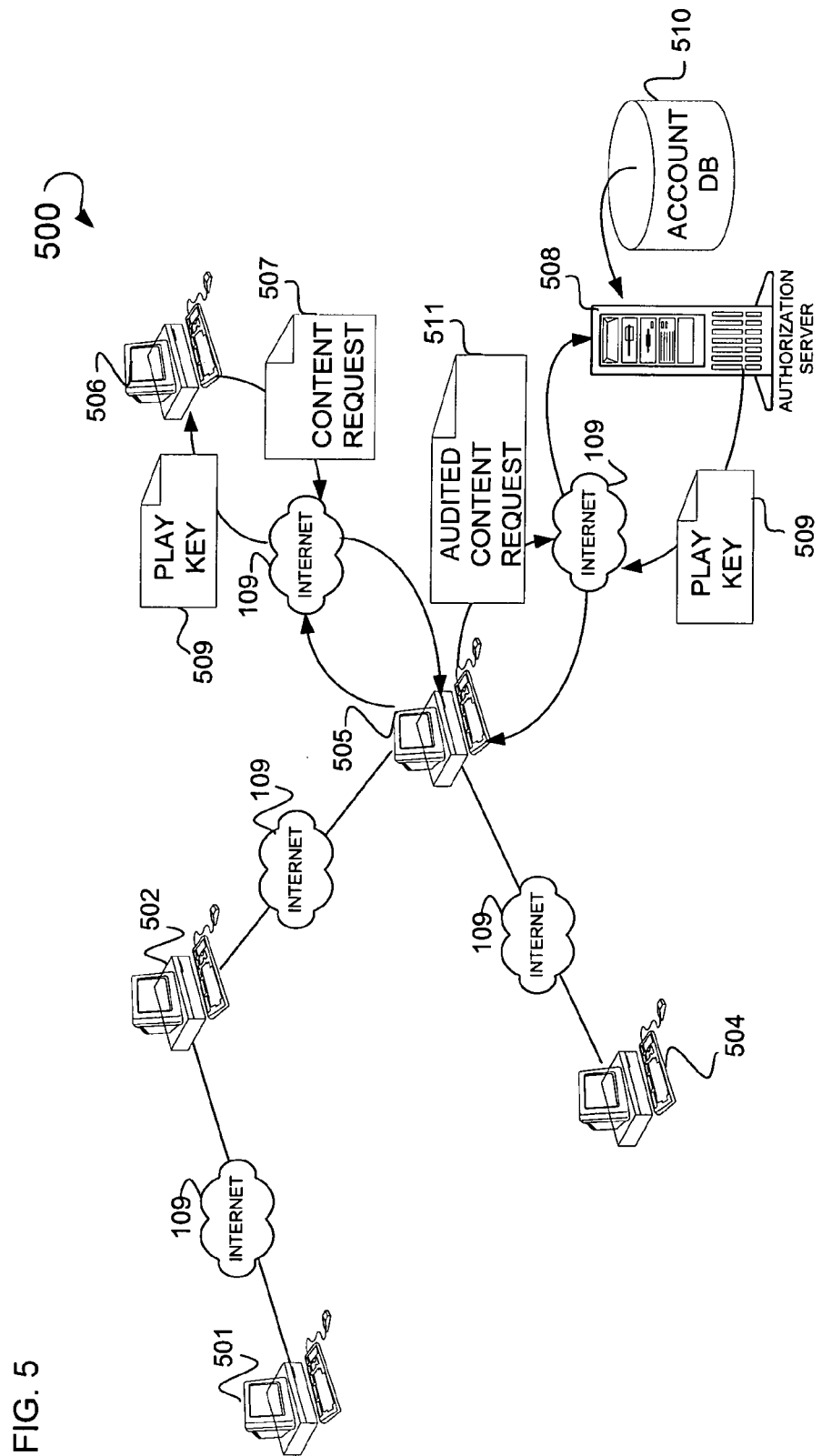
FIG. 5 is a diagram of an example peer-to-peer system illustrating a fully decentralized file directory, according to an example embodiment.

FIG. 5 is a diagram of an example peer-to-peer system 500 illustrating a fully decentralized file directory. Illustrated are a number of peer nodes (e.g., peer computer systems) that may utilize, for example, query flooding to determine the existence of a particular file and which member of the peer-to-peer network has the particular file (e.g., a particular piece of digital content). Illustrated is a plurality of peers such as, for example, peer 501, 502, 504, 505, and 506. In one example, peer 506 generates a content request 507 that is sent across a network 109 to another peer 505. This peer 505 then generates an audited content request 511 that is then transmitted across the network 109 to an authorization server 508. Operatively coupled to this authorization server 508 is an account database 510. In cases where the peer 506 is deemed to have permissions to view the requested content (e.g., digital content as disclosed in content request 507), a play key 509 may be transmitted back across the network 109 by the authorization 508 to the peer 505. This play key may be a symmetric or asymmetric key to decrypt and play the otherwise encrypted audited digital content. This play key, in some cases, may be then transmitted by the peer 505 across a network 109 to the peer 506. In other cases, the peer 505 may decrypt and then transmit a stream of digital content (e.g., an audited digital content stream) to the peer 506. In certain cases, the content request 507 may contain identifying URL information to instruct the receiving peer 505 as to who it must contact (e.g., what authorizing computer system) to determine whether or not a particular peer has permissions to view or otherwise utilize a particular piece of digital content.

Figure 6:
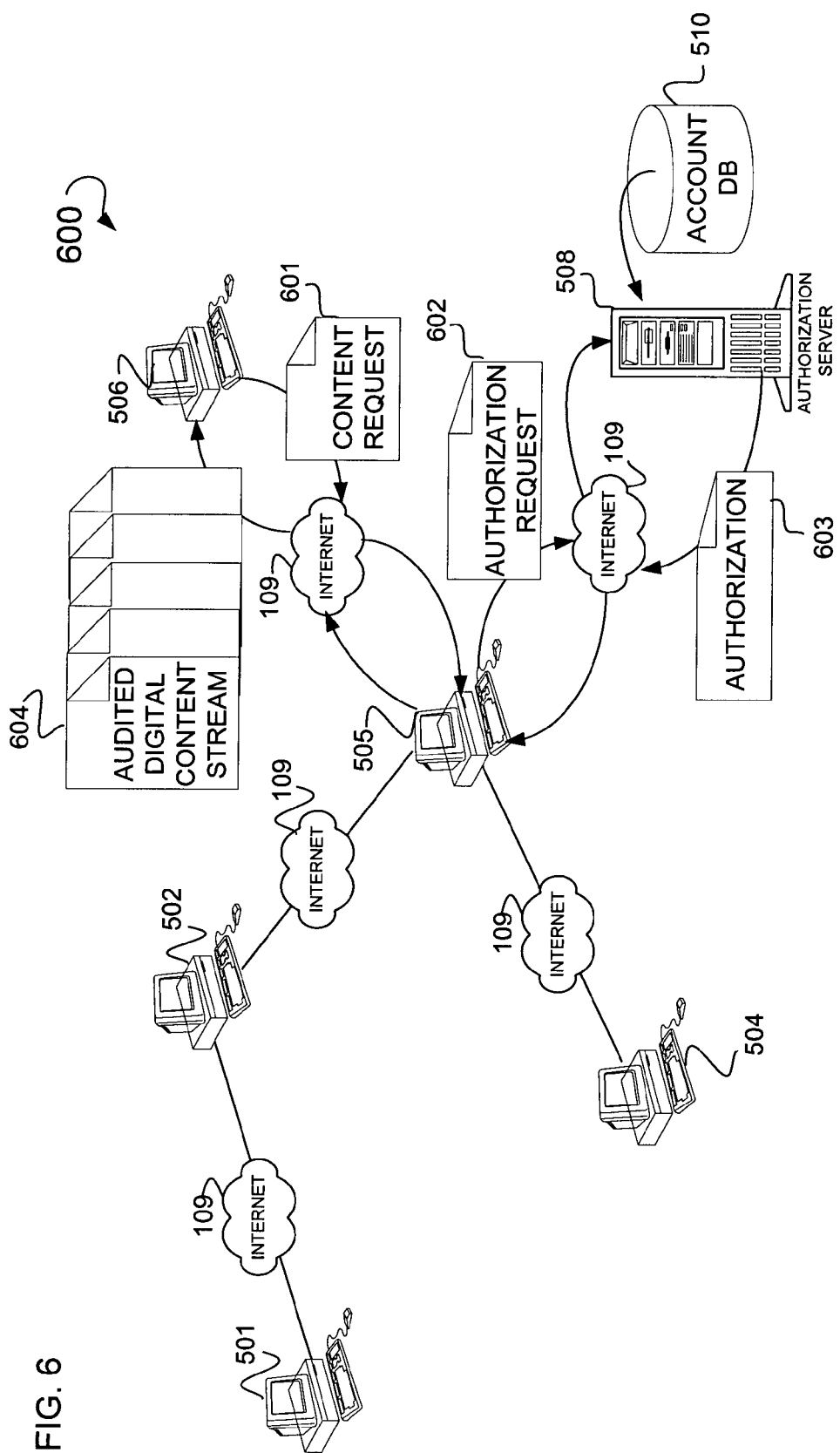
FIG. 6 is a diagram of a peer-to-peer system with a fully decentralized file directory wherein generalized authorization information is transmitted by an authorization server, according to an example embodiment.

FIG. 6 is a diagram of an example peer-to-peer system 600 with a fully decentralized file directory wherein generalized authorization information is transmitted by an authorization server. Illustrated is a peer 506 that generates a content request 601. This content request 601 is transmitted across a network 109 to another peer 505. This peer 505 then generates an authorization request 602 that is transmitted across a network 109 to an authorization server 508. In cases where the peer 506 is deemed to have the appropriate permissions to view a particular piece of digital content, an authorization value containing an authorization packet 603 is transmitted back across the network 109 by the authorization server 508 to the peer 505. Once received by the peer 505, an audited digital content stream 604 is generated and transmitted across network 109 by the peer 505 to the peer 506. In contrast to FIG. 5 where a key is generated and transmitted by the authorization server 505, here an authorization packet 603, containing, for example, some type of signal value denoting that a requesting peer does have a permission, is transmitted. This signal could be as simple as a Boolean value or some other type of value denoting whether or not a certain action is allowed based upon allowed permissions.

Example Interfaces

FIG. 7 is an example GUI 700 used for making a record relating to a digital content upload, such as digital content upload 102. Illustrated is a radio button 701 that, when activated, allows a user to select whether or not the record, and associated uploadable digital content, will be sent to particular recipient. The email address of the recipient may be entered into, for example, textbox 702. In other cases a radio button 703, which here is activated, may be used to directly generate a digital content upload 102 for a predefined community-based content server (see e.g., community-based content server 103). Further illustrated are a variety of permissions 704 relating to what may be done with the digital content upload 102. In certain cases, a user may decide to allow the digital content to be rated, to be segmented and sold in segments or to be sold in its entirety. Other suitable permissions may also be allowed depending on the particular uses that an author or generator of digital content may deem appropriate. Further, a variety of a content type field 705 shows the particular types of digital content that may be uploaded. This digital content may include, for example, a video file, such as a Motion Pictures Expert Group (MPEG) file, an audio file such as a Waveform Audio Format (WAV) file, MP3 file, an RSS file, or even just digital content in the form of uploadable slides (e.g., a POWERPOINT™ presentation). The types of digital content listed here are not meant to be exhaustive, but rather are merely used for illustrative purposes.

Further, a number of other textboxes and labels for these textboxes are provided to allow a user to engage in certain activities when generating a digital content upload. For example, textbox 706 is illustrated wherein the name of an author can be placed, which here is "Spielberg." Further, the title of a piece of digital content may be entered into textbox 707, which here is "Jaws." Moreover, the duration of a particular piece of digital content may be entered, for example, into textbox 708. This duration may be delimited by, for example, semicolons or some other suitable character. Further, in certain cases, where an author of digital content may choose to rate the digital content, that is select a rating permission, then rating information may be entered into textbox 709. Here, the rating values are delimited again with semicolons. Once a record is generated, a widget in the form of button 710 may be executed or if the user decides to enter a new record or otherwise start over a button 711 may be executed. Collectively 705-709 may be referred to as content type information.

Figure 8:
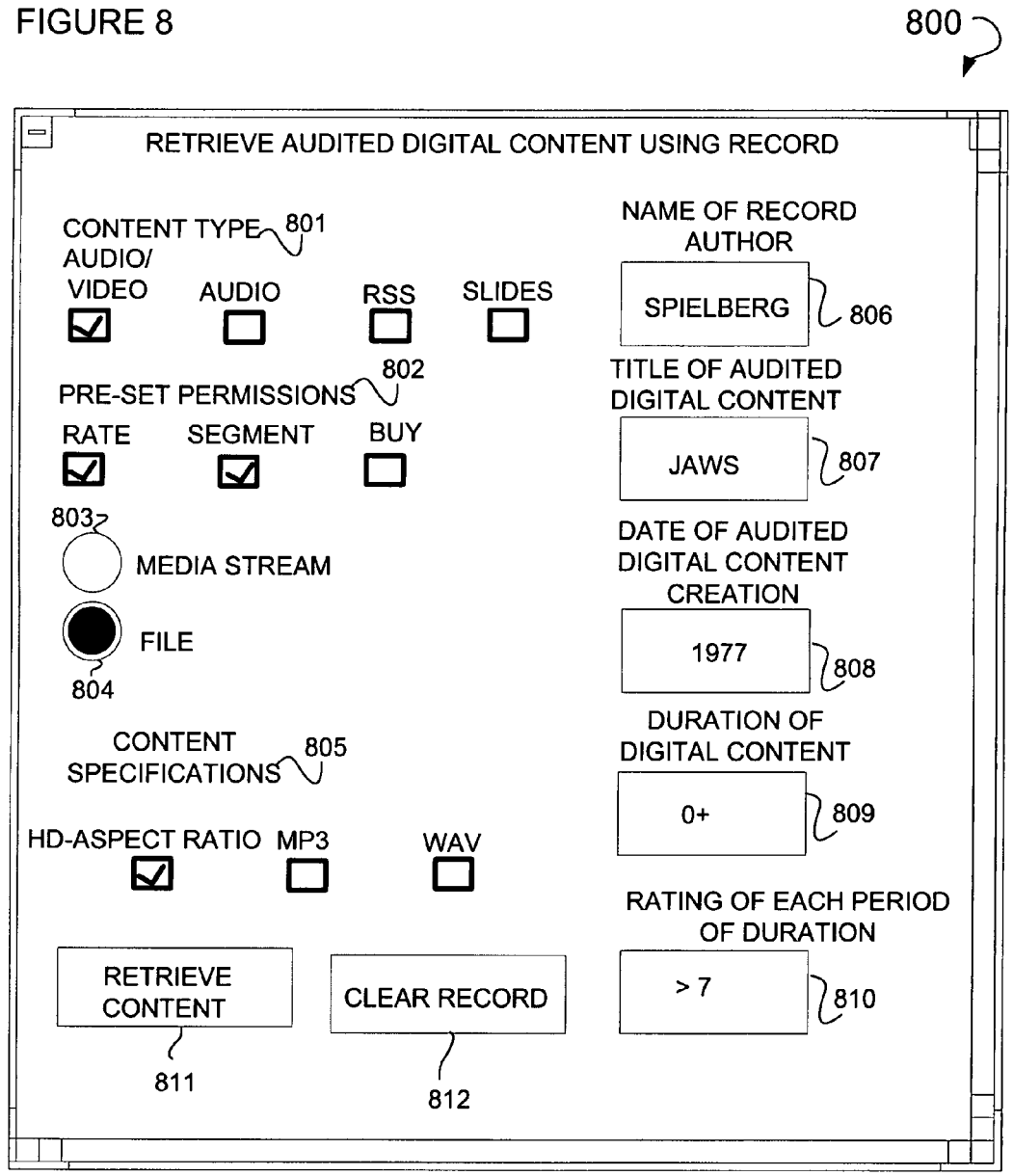
FIG. 8 is a GUI used to retrieve audited digital content, according to an example embodiment.

FIG. 8 is an example GUI 800 illustrating a GUI used to retrieve, for example, audited digital content 117. Illustrated is a content type field 801 containing the type of content that one chooses to retrieve. Here, for example, video content is selected. Other types of content may be, for example, the previously illustrated audio content, RSS feed, or slides. Next, a preset permissions field 802 is illustrated, wherein a user may determine what they would like to do with the audited digital content. Here, for example, a user has selected that they would like to rate a particular segment of audited digital content. Next, a radio button 803 is illustrated that when selected allows a user to receive a media stream containing a particular piece of digital content. In lieu of a media stream, a user may opt to select radio button 804, or they can download an entire audited digital content file. Further, a field 805 is illustrated wherein a user may select the particular format or other characteristics (e.g., playing characteristics or specifications) for a particular piece of digital content. Here, for example, the user has determined that they would like to select a high definition aspect ratio video (e.g., HD-Aspect Ratio). In addition, a particular piece of audited digital content may be identified through, for example, the name of a record author which can be entered into textbox 806. Here this record author is "Spielberg." The title of a particular piece of digital content can be entered into textbox 807 (e.g., "Jaws"). The creation date of the digital content may also be identified via using the textbox 808 which here is "1977." Further, in cases where a user requests a piece of audited digital content with a segment permission enabled, a user may select a particular duration of digital content in text box 809. For example, the user may be able to select all the segments that make up a particular piece of audited digital content or they may be able to select specific segments of the audited digital content. Further, in certain cases where a user seeks to select a particular piece of segmented digital content with a particular rating, ratings information may be entered into textbox 810. Once the appropriate and relevant information is entered into the variety of previously illustrated textboxes, radio buttons and checkboxes, a retrieve content button 811 may be executed. In cases where a user decides to enter new information, a clear records button 812 may be executed.

Figure 9:
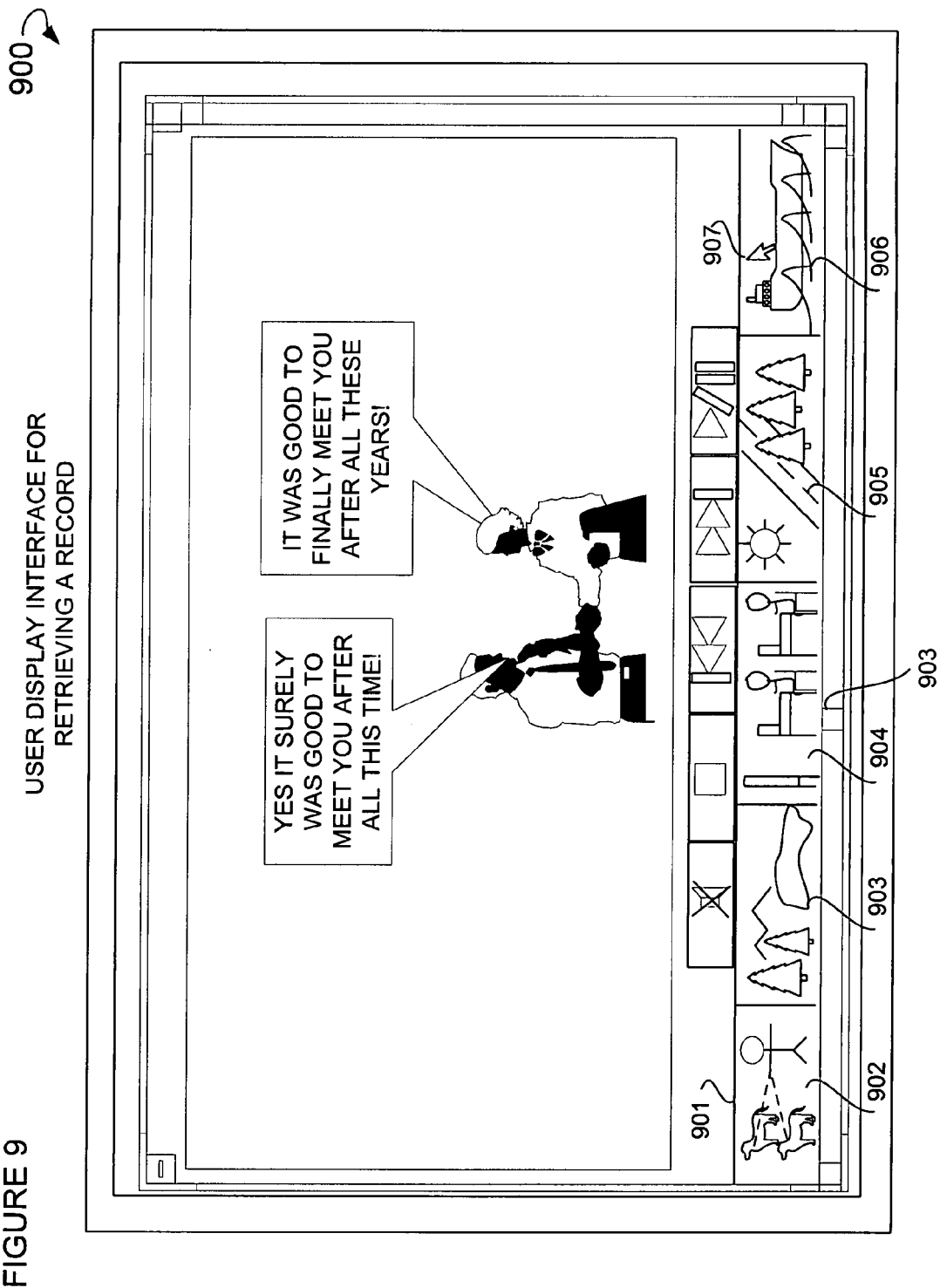
FIG. 9 is a GUI used to display audited digital content, according to an example embodiment.

FIG. 9 is an example GUI 900 illustrating the display of audited digital content. Illustrated is a plurality of storyboard frames 902, 903, 904, 905, and 906 wherein each storyboard frame corresponds to a particular segment (e.g., the beginning of a segment) of a piece of audited digital content. These segments may be referenced via one or more Temporal Reference (TR) values associated with them. Using a collection of player application buttons 901, a user may choose to play a particular segment as depicted in one of the storyboard frames. Further, a user may be able to scroll through the various storyboard frames using a scroll button 907.

Example Logic

Figure 10:
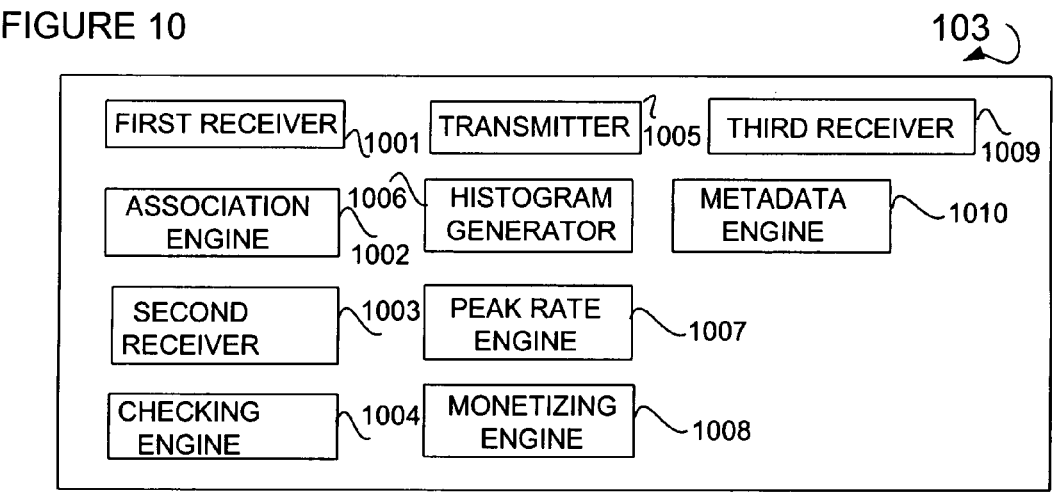
FIG. 10 is a block diagram of an example computer system in the form of, for example, a community based content server, according to an example embodiment.

FIG. 10 is a block diagram of an example computer system in the form of, for example, a community based content server 103. The various blocks depicted in this FIG. 10 may be implemented in hardware, firmware, or even software. Illustrated is a first receiver 1001 to receive auditing data, the auditing data relating to a piece of digital content, an association engine 1002 to associate the auditing data with at least a segment of the piece of digital content to create audited digital content, a second receiver 1003 to receive a content request, the content request pertaining to the audited digital content, a checking engine 1004 to check a permission associated with the audited digital content, the permission to determine an exchange basis, and a transmitter 1005 to transmit the audited digital content. This exchange basis may, for example, be a permission (e.g., the ability to rate, view, transmit or perform other actions on the piece of digital content) that allows a user to access a piece of digital content. This permission may even be the payment of some amount of money based upon a monetization value associated with the digital content. Further, this community based content server 103 may have a histogram generator 1006 to generate a histogram based upon the auditing data, the histogram used, in part, to determine the exchange basis. Also, the community based content server 103 may have a peak rate engine 1007 to conduct a peak rate analysis, the peak rate analysis determining a relationship between the auditing data and a historical auditing data. Additionally shown is a monetizing engine 1008 to audit digital content based upon the relationship between the auditing data and the historical auditing data. In some embodiments, a third receiver 1009 may also be implemented to receive a monetization rule set, the monetization rule set having data used to determine the exchange basis. The community based content server 103 may also have a metadata engine 1010 to generate a metadata file to be associated with the audited digital content, the metadata file containing a location of a permissions party. Another additional or separate function of this metadata engine 1010 may be to generate a metadata file to be associated with the audited digital content, the metadata file containing a script instructing a computer system as to how to process the metadata file.

Figure 11:
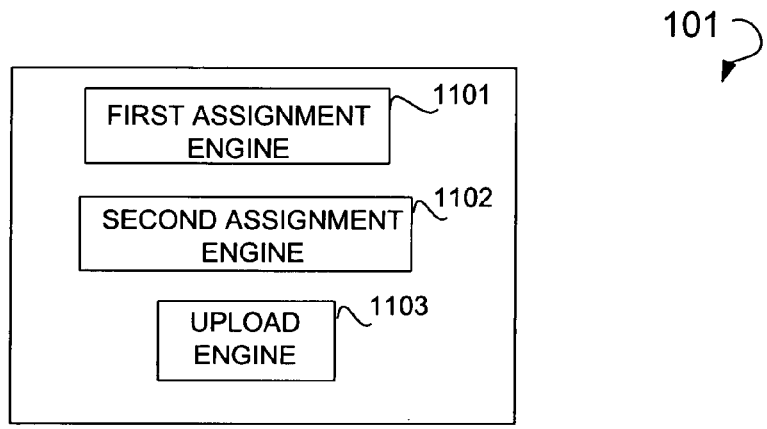
FIG. 11 is a block diagram of an example computer system in the form of, for example, a computer system utilized by a user, according to an example embodiment.

FIG. 11 is a block diagram of an example computer system in the form of, for example, a computer system 101 utilized by a user. The various blocks depicted in this FIG. 11 may be implemented in hardware, firmware, or even software. Illustrated is a first assignment engine 1101 to assign permissions to a piece of digital content, the permissions to determine an exchange basis, a second assignment engine 1102 to assign content type information, the content type information to denote a characteristic of the piece of digital content, and an upload engine 1103 to upload the digital content. The piece of digital content includes at least one of video content, audio content, audio/video content, an electronic slide, a RSS feed, or a graphics files.

Figure 12:
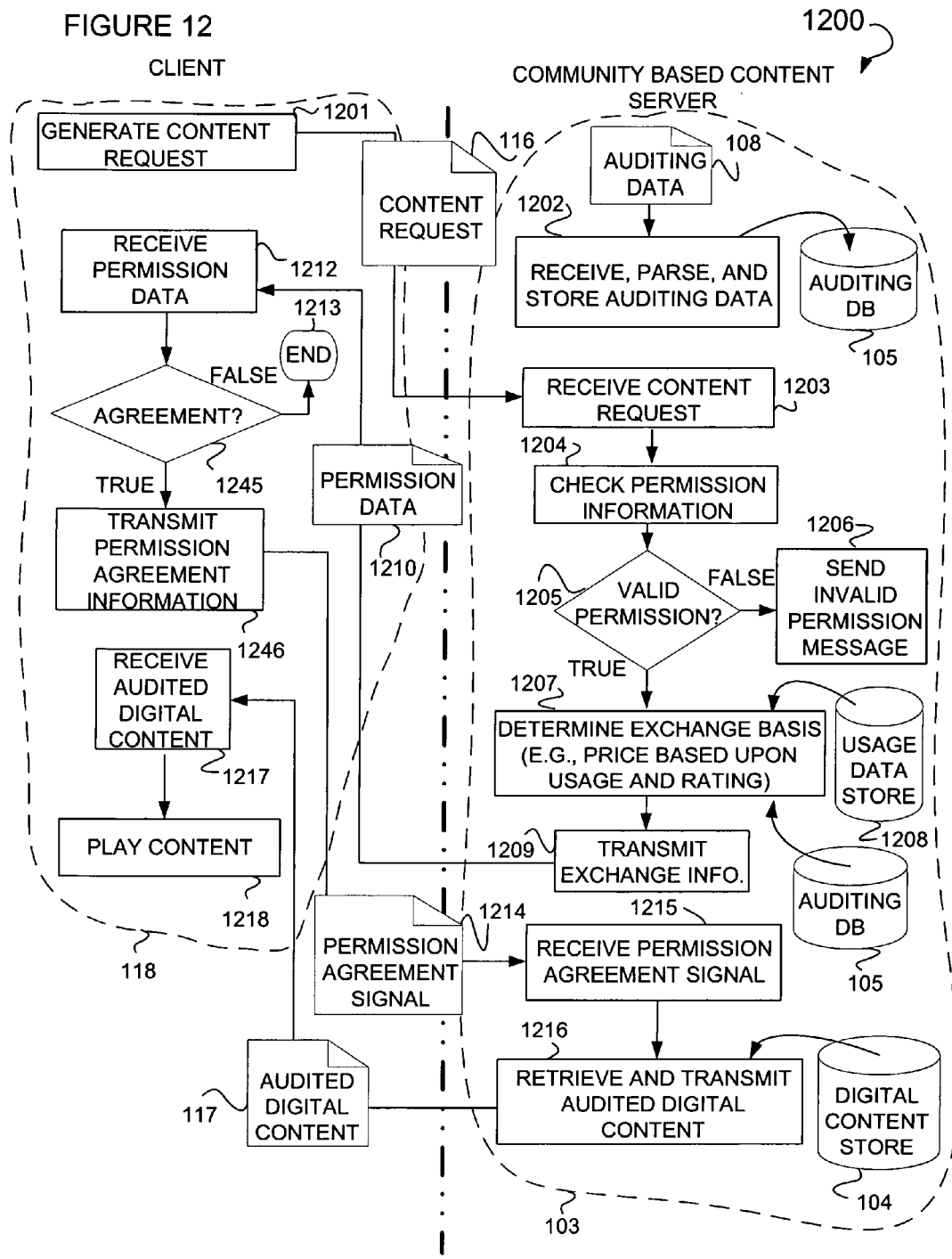
FIG. 12 is a dual stream flowchart illustrating a method used to request and provide audited digital content, according to an example embodiment.

FIG. 12 is a dual stream flowchart illustrating an example method used to request and provide audited digital content. Illustrated is a first stream titled "Client" and a second stream titled "Community Based Content Server." Starting with the "Client" side, an operation 1201 is depicted that generates a content request. This content request 116 is then transmitted to the Community-Based Content Server side. Prior to the generation of this content request 116, certain types of auditing data, such as auditing data 108, may be generated that relate to a particular piece of digital content. This auditing data 108 is then received by an operation 1202 that resides on a community-based content server (e.g., 103). This operation 1202 may then parse the auditing data 108 and generate a histogram from this parsed data. The histogram may reflect such information as the historical use of a piece (e.g., a segment) of audited digital content, or other time related information. This auditing data is then stored into an auditing database 105 by the execution of operation 1202. With regard to the content request 116, an operation 1203 is executed that receives the content request 116 on the community-based content server 103. Once executed, a further operation 1204 is executed that checks permission information associated with the requested content 116. Next, a decisional operation 1205 is executed that determines whether certain permissions are valid such that the requested content in the form of audited digital content may be provided to the requesting client. In some cases this requesting client may be, for example, a computer system 118, whereas the community-based content server may for example be the community-based content server 103. In cases where decisional operation 1205 evaluates to "false", an operation 1206 is executed that sends an invalid permission message to, for example, the computer system 118. In cases where decisional operation 1205 evaluates to "true", a further operation 1207 is executed that determines an exchange basis upon which the audited digital content may be provided or otherwise exchanged with the client, based upon, for example, some monetary value. The determination exchange basis may be based upon, for example, a monetary value based upon usage data taken from a usage data store 1208 and audit data taken from an auditing database 105. In some cases, the exchange basis may be static such that a set value may be affixed to the audited digital content; this value is not changed due to changes in usage or other audit data. Next, an operation 1209 is executed that transmits exchanged information as permission data 1210 to the client. Residing on the client is an operation 1212 that receives this permission data. Once received, a decisional operation 1245 is executed that determines whether or not a user utilizing a computer system 118 has agreed to the permissions associated with the requested content (e.g., 116). In cases where agreement has not been reached (e.g., decisional operation 1245 evaluates to "false"), a termination command 1213 is executed. In cases where agreement is reached (e.g., decisional operation 1245 evaluates to "true"), a further operation 1246 is executed that transmits the permission agreement information as a permission agreement signal 1214. This permission agreement signal 1214 is received through the execution of an operation 1215 that receives the permission agreement signal. Once received, an operation 1216 is executed that retrieves and transmits the audited digital content 117 from, for example, a digital content store 104. This audited digital content 117 is then transmitted and received through the execution of an operation 1217 that receives the audited digital content. Then, an operation 1218 is executed, that plays the audited digital content.

Some embodiments may include the permission utilized by operation 1207 generated at the time that a piece of digital content is uploaded (see e.g., FIG. 7). Specifically, while, for example, monetization may be determined based upon criteria such as historical use (see e.g., FIG. 15 below), in some embodiments, an author/owner of digital content may choose to set certain static permissions that do not change, and hence, set a static exchange basis. For example, an author/owner may choose to always allow their uploaded digital content to be segmented or to never be sold. (See e.g., FIG. 18 below.)

Figure 13:
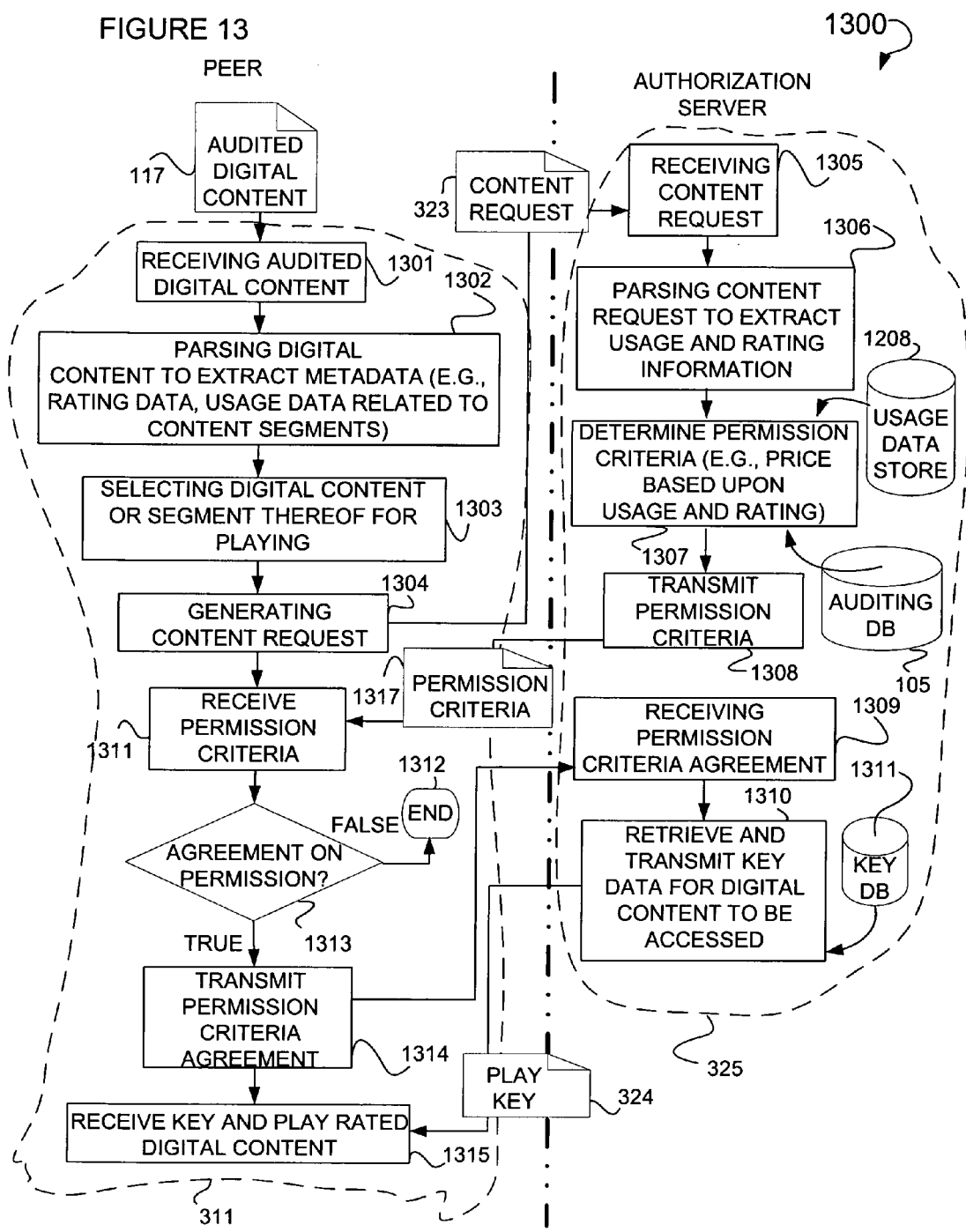
FIG. 13 is a dual stream flowchart illustrating a method implemented in a peer-to-peer network context for the requesting of digital content and the providing of audited digital content in response to the request, according to an example embodiment.

FIG. 13 is a dual stream flowchart illustrating an example method 1300 implemented in a peer-to-peer network context for the requesting of digital content and the providing of audited digital content in response to the request. Illustrated is a first stream titled "Peer" and a second stream titled "Authorization Server". With regard to the peer side, audited digital content 117 may be received by a peer wherein this audited digital content 117 is received through the execution of an operation 1301 that receives the audited digital content. Next, an operation 1302 is executed that parses the audited digital content to extract certain metadata information relating to, for example, the rating of the audited digital content, the usage data relating to the audited digital content, the location of an authorization server (e.g., based upon a URL value), and other types of relevant information. Next, an operation 1303 is executed wherein a user may select the audited digital content, or a segment thereof, for playing. In cases where operation 1303 is executed, an operation 1304 is subsequently executed that generates a content request such as content request 323. Through the execution of an operation 1305 residing on the authorization server, such as authorization server 325, a content request is received. Then, an operation 1306 is executed that parses the content request 323 to extract usage and rating information. Further, an operation 1307 is executed to determine certain permission criteria associated with the requested content 323. This permission criteria may be, for example, price based information utilizing usage data and rating data. This information (e.g., the usage data) may be obtained from, for example, a usage data store 1208. The other auditing information may be obtained from, for example, auditing database 105. Next, an operation 1308 is executed that transmits the permission criteria from the authorization server 325 to for example an ordinary peer device 311 as, for example, permission criteria 1317 through the execution of an operation 1311 that receives permission criteria. This information (e.g., the permission criteria) is then transmitted to a decisional operation 1313. In cases where a decisional operation 1313 evaluates to "false", an end operation 1312 is executed denoting that a user utilizing the ordinary peer device 311 has decided not to agree to the permission criteria. In cases where decisional operation 1313 evaluates to "true," that is, agreement is reached on the permission criteria, an operation 1314 is executed that transmits a permission criteria agreement signal. This permission criteria agreement signal is received through the execution of an operation 1309, wherein this operation 1309 resides on the authorization server 325. Further, an operation 1310, also residing on the authorization server 325, is executed that retrieves and transmits key data such as from a key data or key database 1311. This key data may be, for example, symmetric or asymmetric key information which is then transmitted in the form of a play key value or file 324. This play key value or file 324 is then received via the execution of an operation 1315 residing on the ordinary peer device 311. Once received, the digital content may be played subject to certain permission criteria limitations.

In some embodiments, once the audited digital content 117 is played, the metadata associated with this audited digital content is updated based upon how the digital content is played or otherwise accessed (e.g., if it is rated, provided to a third party, or accessed in some other way, permissions permitting). This metadata file is updated such that if another peer should request this audited digital content, then the metadata will reflect the most recent access of the digital content (e.g., by ordinary peer device 311).

Figure 14:
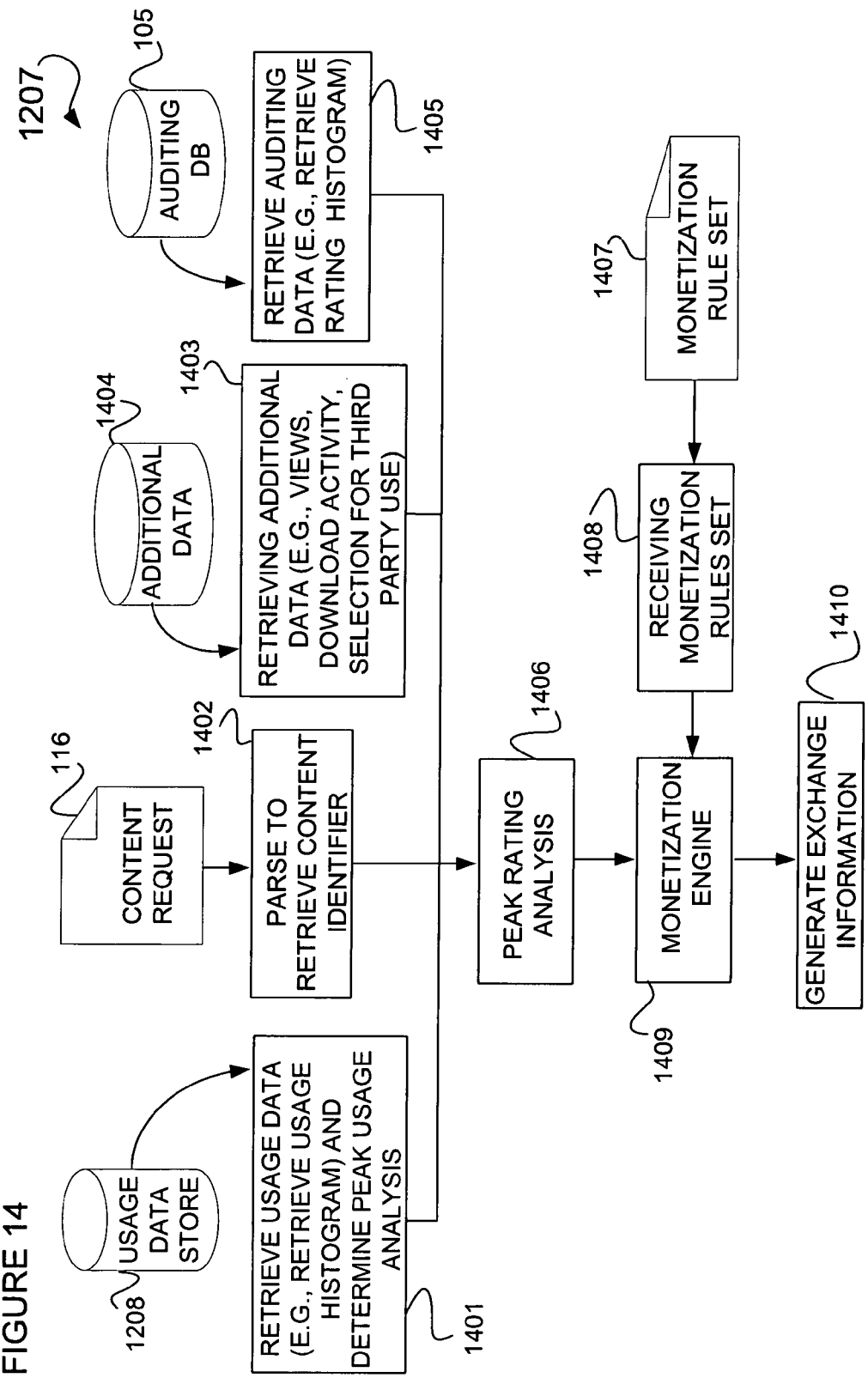
FIG. 14 is a flowchart illustrating a method used to execute an operation that determines an exchange basis upon which audited digital content may be provided or otherwise exchanged with a client, according to an example embodiment.

FIG. 14 is a flowchart illustrating an example method used to execute operation 1207. Illustrated is an operation 1401 that retrieves usage data from, for example, a usage data store 1208. This usage data may relate to, for example, the usage of a particular piece of audited digital content by one or more users, whereas this usage may be, for example, downloading, viewing, rating or other types of activities associated with auditing of the digital content. In certain cases, this usage data is stored as a usage histogram such that when operation 1401 is executed, this histogram is retrieved from the usage data store 1208 and a determination is made as to what are the peak usage periods for a particular piece of audited digital content. Further illustrated is an operation 1402 that receives a content request 116 and parses this content request 116 to obtain or otherwise retrieve a content identifier. This content identifier may be, for example, some type of uniquely identifying value to identify the content. Further, an operation 1403 is executed that retrieves additional data from an additional data database 1404. This additional data may be, for example, download activity data, selection data for third party use, or other data deemed relevant for determining certain permissions associated with a piece of audited digital content. Further, an operation 1405 is executed that retrieves auditing data wherein this auditing data may be, for example, a rating histogram that is stored in an auditing database 105.

Once operations 1401 through 1405 are executed in parallel or in sequence, an operation 1406 is executed. This operation 1406, as will be more fully described below, may be used to determine peak usage times or other information that may be germane for the purposes of monetizing, or otherwise attaching a monetary value to a particular piece of audited digital content. Next, an operation 1409 is executed that, in effect, associates a monetary value with a particular piece of audited digital content or segment thereof. This association may be ultimately based upon rules supplied as a monetization rule set 1407 that is provided to an operation 1408 that acts to receive this monetization rule set 1407. Once received by the operation 1408, the operation 1409 may be provided with data residing within the monetization rule set 1407 for it to make the association between the audited digital content and a particular monetary value. Once the monetization engine 1409 executes, an operation 1410 is executed that generates exchanged information. This exchanged information may not only be, for example, a monetary value associated with a particular piece of audited digital content, but additionally may contain information relating to other types of bases for exchange. That is, for example, in certain cases, an author of a particular piece of audited digital content may not wish that the audited digital content or segment thereof be monetized, but rather is willing to freely provide the audited digital content for viewing by, for example, a user utilizing a computer system 118. Further, this exchanged information may include, for example, certain other types of limitations or other permissions that may enable disabling one from viewing or otherwise utilizing a particular piece of audited digital content.

In some embodiments, the monetization rule set 1407 contains a set of instructions for determining the monetary value for collection of audit data. For example, the monetization rule set 1407 may be an XML based, or a character delimited flat file denoting a range of monetary values to be associated to or mapped to the range percentile values representing where a particular piece of audited digital content falls historically relative to other pieces of audited digital content. In some cases, this monetization rule set 1407 may contain some multiplier value, such that the product of this multiplier value and the percentage value is a monetary value to be associated with a piece of audited digital content. Still further, in some embodiments, monetization rule set 1407 may contain map number of monetary values to be mapped to a range of percentile values, such that one monetary value may map to multiple percentile values.

FIG. 15 is a flowchart illustrating an example method used to execute operation 1406. Illustrated is an operation 1501 that receives data, wherein this data may be, for example, a usage histogram data, a content identifier value, data in the form of download activity, third party use or view data, and/or a rating histogram data. Once this data is received through the execution of the operation 1501, an operation 1502 is executed wherein this operation 1502 generates a percentile value reflecting where the particular piece of audited digital content may fall relative to a historical analysis of the various types of previously received data relating to other audited digital content. For example, based upon the received data, a determination may be made that a particular piece of audited digital content is at its height, or, more accurately, is a part of the highest percentile value (e.g., top 5%) of usage by users. More to the point, the received data may, for example, reveal that the audited digital content is rated higher than other audited digital content; that it has been downloaded more than other audited digital content, or has been used by more third parties. Once a determination is made as to where the particular piece of audited digital content falls historically in terms of its usage vis-à-vis other pieces of audited digital content, an operation 1503 is executed that transmits this percentile value. In certain cases, this percentile value will then be used by, for example, a monetization engine 1409 to determine what monetary value to associate with the particular piece of audited digital content. For example, where the audited piece of digital content is at its height (e.g., in the top 5%), then a higher monetary value may be associated with it. In contrast, in cases where the audited piece of digital content is at a low end of its use (e.g., at the bottom 5%), then a lower monetary value may be associated with it.

FIG. 16 is a diagram of an example audited digital content file 117 and the various portions of data that make up this file. Illustrated is a metadata file such as, for example, an XML file 1601 that is associated with, for example, some type of data packet such as an MPEG file. Contained within this MPEG file may be, for example, a Real-Time Transport Protocol (RTP) text header 1602, an MPEG specific header 1603 and a RTP packet 1604 that contains the actual digital content. One or more of these packets (e.g., 1602, 1603, and 1604) may be contained as a part of the audited digital content file 117.

FIG. 17 is a diagram of an example audited digital content file 117 that utilizes a script in addition to a metadata file. Illustrated is a script and metadata file 1701, wherein the script and metadata file 1701 contains not only metadata describing the actual audited digital content, but also contains a script containing logic that, when executed by, for example, a computer system 118, will instruct the computer system 118 on certain functions to perform, permissions to observe, or other ways of manipulating and utilizing the audited digital content. This is in contrast to the metadata file illustrated in FIG. 16 that merely contains a description of the data, but no instructions or logic set describing how to utilize the audited digital content. This script may be written as an Information (.inf) file, VBScript™ (.vb) file, JAVAScript™ (.js) file, or some other suitable file format.

Figure 18:
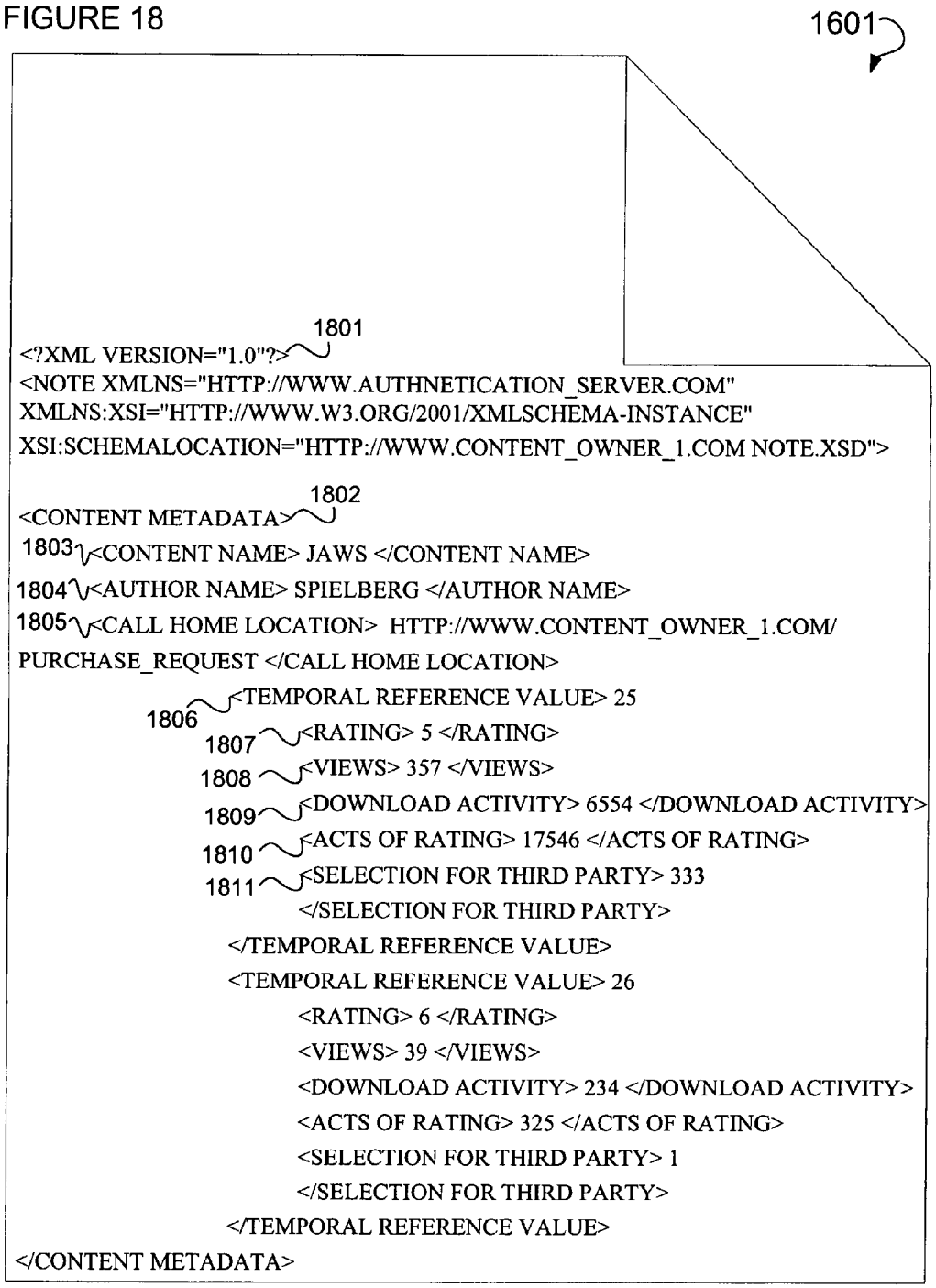
FIG. 18 is a diagram of an example metadata file, according to an example embodiment.

FIG. 18 is a diagram of an example metadata file 1601. Illustrated is a metadata file written in, for example, an XML format. Shown is a header value 1801 containing a location of an eXtensible Schema Definition (XSD) file that may be used to interpret the XML data contained in the metadata file 1601. In some cases, a Document Definition Type (DTD) file may be used in lieu of the XSD file. Further, illustrated is a tag 1802 titled content metadata. This tag denotes the beginning of the metadata used in the metadata file 1601. Further, a content name tag 1803 is illustrated that contains the name of a particular piece of content which here is Jaws. Also illustrated is a tag 1804 titled author name that illustrates the name of a particular author associated with a particular piece of content. Additionally, a call home location 1805 is illustrated denoting the location of a particular party (e.g., a permissions party) that must be notified for the purposes of determining the permissions associated with the particular piece of audited digital content, such as audited digital content 117. Next, a tag 1806 is illustrated containing the various TR values associated with a particular piece of audited digital content. These TR values may correspond to various temporal reference values contained in the previously illustrated RTP fixed header 1602, MPEG specific header 1603 or some other portion of a data packet. Also, a ratings tag 1807 is illustrated that contains a rating for a particular piece of audited digital content associated with a temporal reference value. Next, a tag 1808 titled views is illustrated containing the number of times the particular piece of audited digital content has been viewed. Further, a tag 1809 is illustrated describing the download activity that is the number of times a particular piece of audited digital content has been downloaded. Moreover, a tag 1810 is illustrated denoting the number of times a particular piece of audited digital content has been rated (e.g., instances of rating). A tag 1811 is also illustrated that denotes the number of times that a particular piece of audited digital content has been selected for viewing by a third party. These various tags (e.g., 1806-1811) are not meant to be exhaustive, but are merely used for illustrative purposes. Other tags may be utilized within the metadata file 1601.

In some embodiments, in addition to the tags displayed in FIG. 18, additional permission tags may also be displayed in the metadata file 1601 relating to the various permissions associated with the audited digital content shown by the metadata in metadata file 1601. These permission tags may be used in conjunction with, or in lieu of, the tags displayed in FIG. 18. These permission tags may be illustrated as follows:

<RATING> Y </RATING>

<SEGMENT> Y </SEGMENT>

<SELL> N </SELL>

<PROVIDE TO THIRD PARTY> N </PROVIDE TO THIRD PARTY>

As is illustrated above, these permission tags may describe various boolean values denoting what permissions exist for a particular piece or segment of audited digital content. These segments may be denoted by a TR value, or range of TR values. For example, the rating tag denotes that this piece of audited digital content may be rated by a user. Further, the segment tag points to the fact that the piece of audited digital content may segmented, that is divided into smaller pieces of audited digital content. Additionally, the audited digital content may not be sold, as illustrated by the sell tag. The audited digital content may not be provided to a third party, as shown by the illustrated third party tag. Through these permissions, an author/owner of audited digital content may control how segments of their audited digital content are ultimately used by other users such as members of a viewing community. A character delimited flat file may be used in lieu of the above shown tags.

Figure 19:
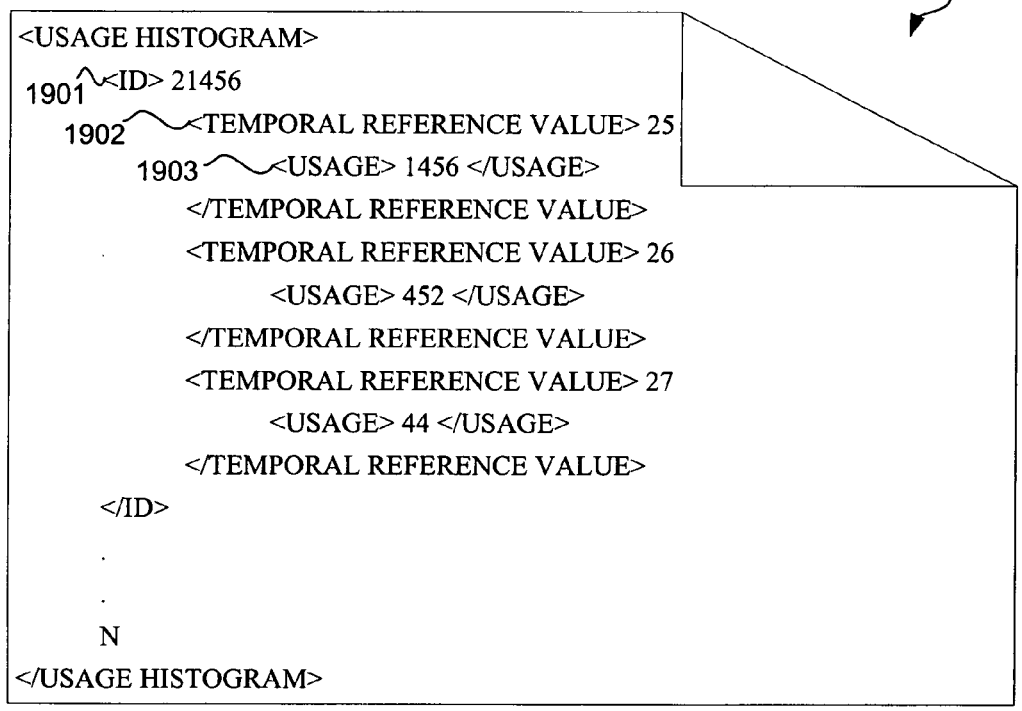
FIG. 19 is a diagram of a usage histogram, according to an example embodiment.

FIG. 19 is a diagram of an example usage histogram 1900. Illustrated is a usage histogram 1900 written for example using an XML format. Illustrated is an ID tag 1901 that uniquely identifies a piece of audited digital content. The value denoted by the ID tag 1901 may correspond to a database key value. Further, a TR value tag 1902 is shown that contains the TR value for a particular piece of audited digital content. Further, a usage tag 1903 is illustrated containing the number of times a particular piece, a particular segment, or portion of audited digital content corresponding to the TR value as denoted by tag 1901, has been used. This usage histogram 1900 may, for example, be generated by the operation 1202 and stored in a usage data store 1208. In some embodiments, it may even be stored in an auditing database 105. While this usage histogram is formatted in XML, other types of formats may be used such as, for example, some type of character delimited flat file, or some other suitable format.

Figure 20:
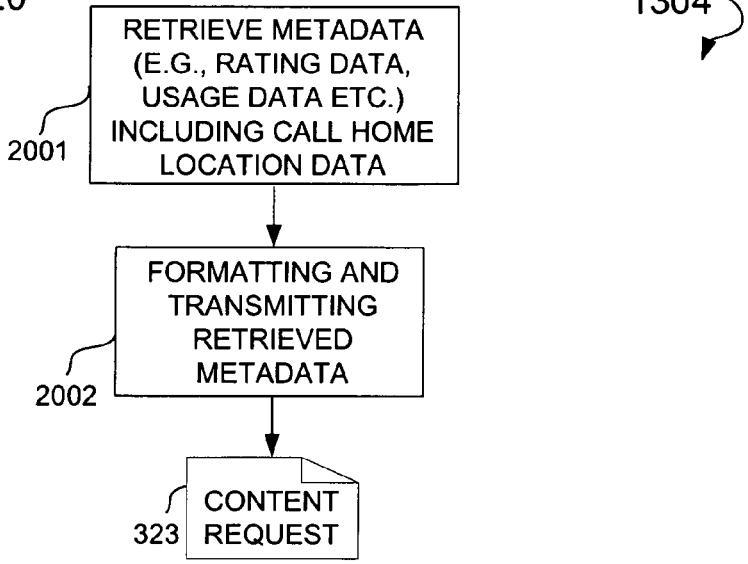
FIG. 20 is a flowchart illustrating a method used to execute an operation that generates a content request, according to an example embodiment.

FIG. 20 is a flowchart illustrating an example method used to execute operation 1304. Illustrated is an operation 2001 that retrieves metadata including, for example, call home location data (see e.g., call home location tag 1805). Once this metadata is retrieved, a further operation 2002 is executed that formats and transmits the received metadata. The metadata is transmitted as part of a content request 323.

Figure 21:
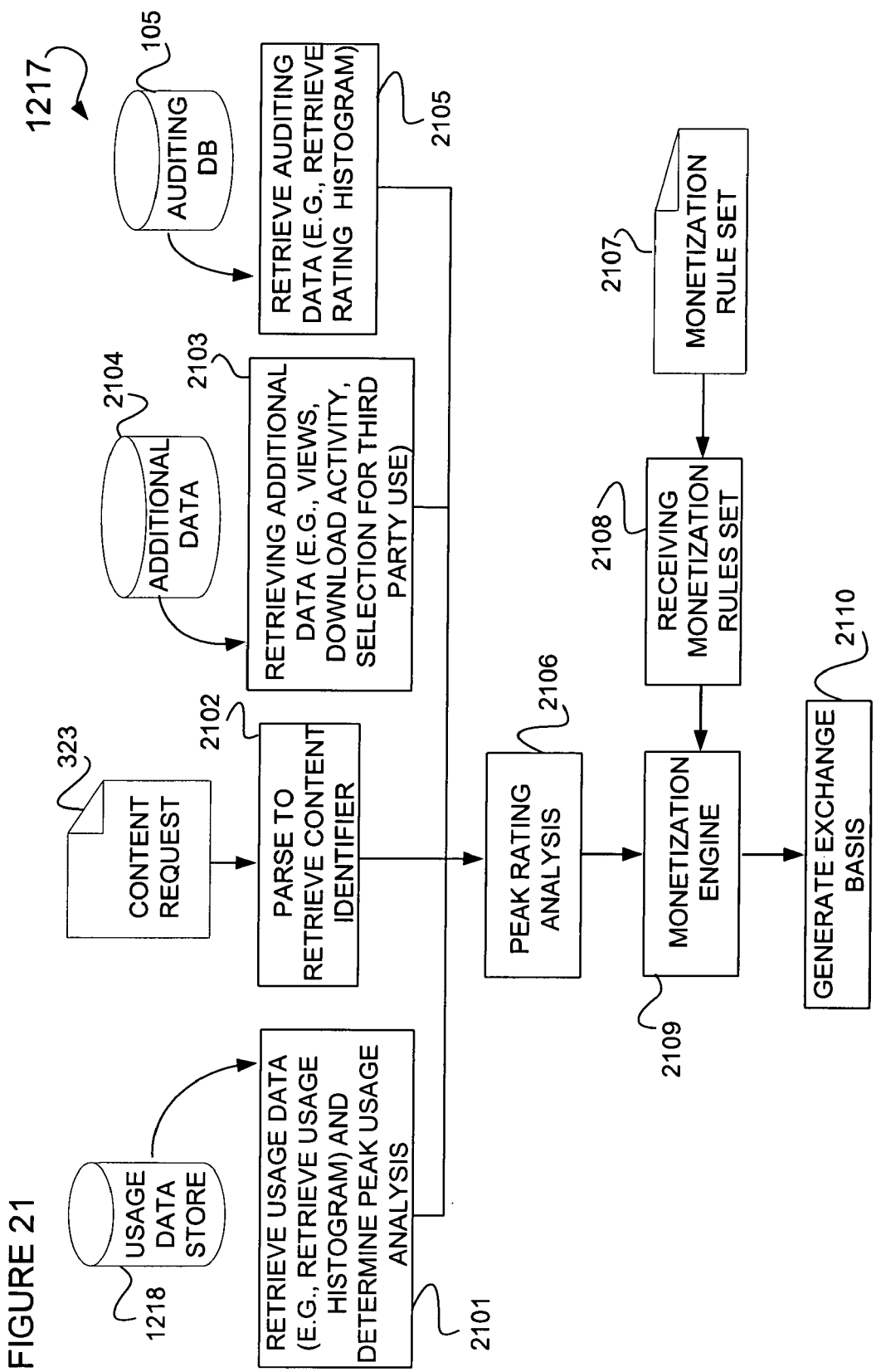
FIG. 21 is a flowchart illustrating a method used to execute an operation that receives audited digital content, according to an example embodiment.

FIG. 21 is a flowchart illustrating an example method used to execute operation 1217. Illustrated is an operation 2101 that retrieves usage data such as, for example, the previously described usage histogram and uses it for the determination of a peak analysis. Further, an operation 2102 is executed that parses a content request 323 to retrieve content identifier information. Next, an operation 2103 is executed that retrieves additional information. This additional information may be, for example, views information, download activity such as for third party use, or other domain information use in auditing of a piece of digital content. Next, an operation 2105 is executed that retrieves auditing data such as, for example, retrieving a rating histogram from, for example, an auditing database 105. Once these various operations are executed in parallel or in sequence (e.g., operations 2101-2105), an operation 2106 is executed that determines a peak analysis rating. This operation 2106 is in many ways akin to operation 1406. Next, an operation 2109 is executed in the form of a monetization engine. This operation 2109 is akin to operation 1409, and similarly an operation 2108 is akin to an operation 1408. This operation 2108 receives a monetization rule set 2107 that is akin to a monetization rule set 1407. Once operations 2108 and 2109 are executed, an operation 2110 is executed that generates an exchange basis. As previously discussed with regard to operation 1410 in FIG. 14, the operation 2110 may generate an exchange basis or bases in the form of determining what permissions exist to allow one to view or otherwise utilize a piece of audited digital content. These permissions have been previously illustrated above.

In one embodiment, a system and method is illustrated and includes an operation that when executed facilitates receiving auditing data relating to a piece of digital content (e.g., operation 1202), associating the auditing data with the piece of digital content to create audited digital content (e.g., operation 1202), receiving a content request pertaining to the audited digital content from a requester (e.g., operation 1203), checking a permission associated with the audited digital content, the permission to determine an exchange basis upon which the audited digital content is provided to the requester, and where the exchange basis defines the condition upon which the audited digital content may be accessed (e.g., operations 1204-1207), and providing the audited digital content to the requester according to the exchange basis (e.g., operation 1216).

Example Databases

Some embodiments may include the various databases (e.g., 104, 105, 203, 326, and 510) being relational databases, or, in some cases, On Line Analytical Processing (OLAP) based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, containing multidimensional data from which data is selected from or inserted into using a Multidimensional Expression Language (MDX), may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 22:
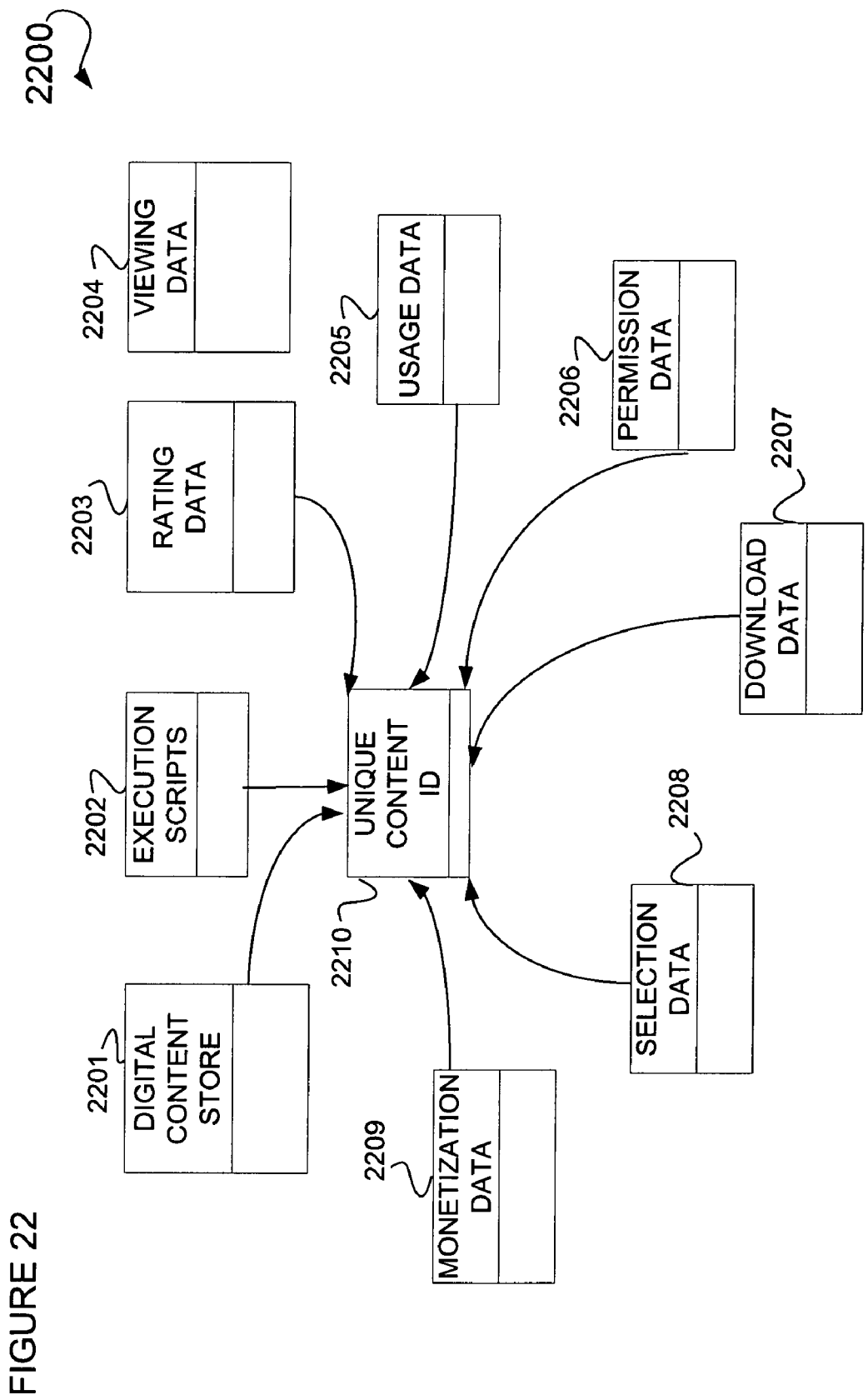
FIG. 22 is a Relational Data Schema (RDS) illustrating various types of tables containing data that may reside on an audit database and/or a digital content store, according to an example embodiment.

FIG. 22 is an RDS 2200 illustrating various types of tables containing data that may reside on, for example, the database 105 or a digital content store 104 or a combination of the two. These tables may also reside on other data stores previously illustrated above, shown as a table 2201 titled "Digital Contents Store," wherein this table 2201 contains a variety of types of digital content (e.g., audio content, video content, RSS fee content, slide content, or other suitable digital content). This digital content may be stored as, for example, a Binary Large Object (BLOB) in the table 2201. Further, a table 2202 is illustrated containing various execution scripts. These execution scripts may be, for example, logic associated with the metadata file that is provided to a computer system, such as computer system 118, for execution and use in determining how a particular piece of audited digital content may be accessed and the circumstances under which it may be accessed. These scripts may be stored as a BLOB or XML data type. Further illustrated is a table 2203 containing rating data. This rating data may be, for example, in the form of integers or other types of data types that may be used to denote a rating of a particular piece of audited digital content. Further, a table 2204 is illustrated that contains viewing data. This viewing data may be some type of data type such as an integer that denotes the number of times a particular piece of audited digital content has been viewed. Further, illustrated is a table 2205 containing usage data. This usage data may be in the form of, for example, an integer or other suitable data type that may be used to denote the number of times a particular piece of audited digital content has been used or otherwise accessed. Additionally, a table 2206 is illustrated that contains permission data, wherein this permission data may be, for example, a collection of boolean value data types that denote what permissions are associated with a particular piece of audited digital content. Table 2207 contains download data, wherein this download data will denote the format in which a particular piece of digital content may be downloaded (e.g., as a file or as a data stream). A character (e.g., "F" for file or "S" for stream) or other suitable data type may be used to denote this format. Table 2208 contains selection data wherein the selection data denotes the number of times a particular piece of audited digital content has been selected for use. This selection data may be in the form of, for example, an integer or other suitable data type. Further, a table 2209 is illustrated that contains monetization data, wherein this monetization data may be, for example, a float, integer, or some other type of data value that allows for the monetization of a particular piece of audited digital content to be established. In certain circumstances, this monetization data may also be certain percentage values and monetary values associated with percentage values such that, for example, when a particular piece of audited digital content is at its height of usage (e.g., is within a top percentile) then a higher monetization value may be associated with the percentage value. Additionally illustrated is a unique content identifier value 2210. This unique content identifier value may be used as a key value to uniquely identify each of the various entries in the various tables (e.g., 2201-2209). These various tables are not meant to be exhaustive, but rather they are meant to be illustrative of various tables that may be utilized within one or more embodiments of the system and method described herein.

Component Design

Some example embodiments may include the above-illustrated operations being written as one or more software components. Common to many of these components is the ability to generate, use, and manipulate the above-illustrated UI elements, layout elements and the data associated therewith. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), Distributed Component Object Model (DCOM), or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is remotely located from a second computer system containing an interface level (e.g., a GUI). These first and second computer systems can be configured in a server-client, peer-to-peer, or some other configuration. The various levels can be written using the above-illustrated component design principles and can be written in the same programming language or different programming languages. Various protocols may be implemented to enable these various levels and the components contained therein to communicate regardless of the programming language used to write these components. For example, an operation written in C++ using Common Object Request Broker Architecture (CORBA) or Simple Object Access Protocol (SOAP) can communicate with another remote module written in JAVA™. Suitable protocols include SOAP, CORBA, and other protocols well-known in the art.

A System of Transmission Between a Server and Client

Some embodiments may utilize the Open Systems Interconnection Basic Reference (OSI) model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

Figure 23:
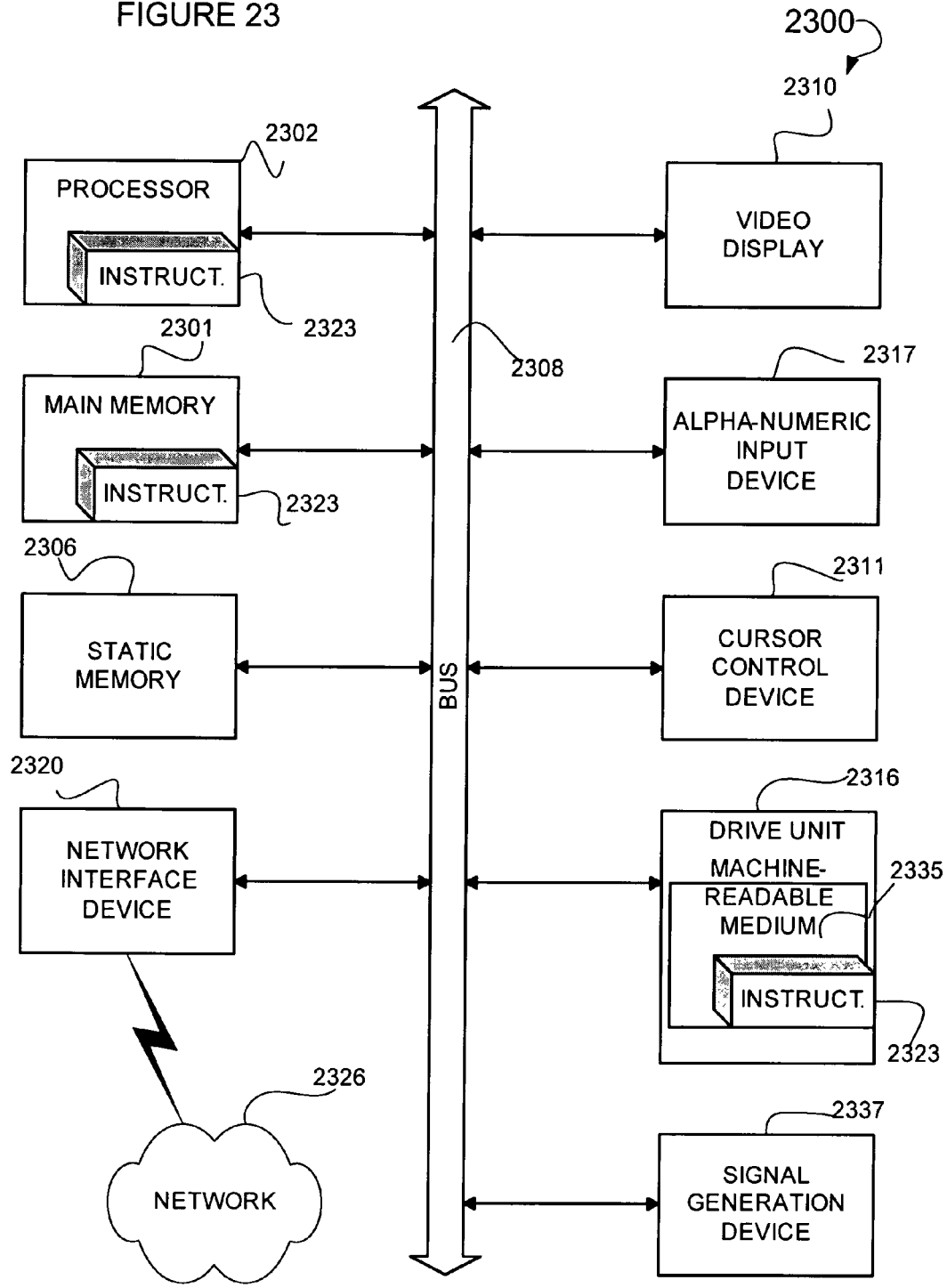
FIG. 23 shows a diagrammatic representation of a machine in the example form of a computer system, according to an example embodiment.

FIG. 23 shows a diagrammatic representation of a machine in the example form of a computer system 2300 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks such as those illustrated in the above description.

The example computer system 2300 includes a processor 2302 (e.g., a Central Processing Unit (CPU), a Graphics Processing Unit (GPU) or both), a main memory 2301, and a static memory 2306, which communicate with each other via a bus 2308. The computer system 2300 may further include a video display unit 2310 (e.g., a Liquid Crystal Display (LCD) or a Cathode Ray Tube (CRT)). The computer system 2300 also includes an alphanumeric input device 2317 (e.g., a keyboard), a User Interface (UI) cursor controller 2311 (e.g., a mouse), a disk drive unit 2316, a signal generation device 2337 (e.g., a speaker) and a network interface device (e.g., a transmitter) 2320.

The disk drive unit 2316 includes a machine-readable medium 2335 on which is stored one or more sets of instructions and data structures (e.g., software) 2323 embodying or used by any one or more of the methodologies or functions illustrated herein. The software may also reside, completely or at least partially, within the main memory 2301 and/or within the processor 2302 during execution thereof by the computer system 2300, the main memory 2301 and the processor 2302 also constituting machine-readable media.

The instructions 2323 may further be transmitted or received over a network 2326 via the network interface device 2320 using any one of a number of well-known transfer protocols (e.g., Hyper Text Transfer Protocol (HTTP), Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Marketplace Applications

In some embodiments, entire portions or segments of digital content are assigned permissions and audited by users. The permissions are established by author/owners of the digital content. The audits performed on this digital content can include rating the digital content, using the digital content, downloading the digital content, providing or otherwise recommending the digital content to a third party, or some other permitted use. Once audited, these portions or segments of digital content are, for example, available for download as audited digital content. In some embodiments, a monetary value may be associated with the audited digital content such that a monetary fee may be charged for being allowed to execute the permission to download a piece of audited digital content. In many cases, this monetary fee may be based upon the audit data as reflected in, for example, a histogram.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving auditing data relating to a piece of digital content;
associating, using one or more processors, the auditing data with the piece of digital content to create audited digital content;
receiving a content request pertaining to the audited digital content from a requester;
checking a permission associated with the audited digital content, the permission to determine an exchange basis upon which the audited digital content is provided to the requester, and where the exchange basis defines the condition upon which the audited digital content is accessible;
generating a histogram based upon the auditing data, the histogram used, in part, to determine the exchange basis;
conducting a peak rate analysis; and
providing the audited digital content to the requester according to the exchange basis.

2. The method of claim 1, wherein the conducting of a peak rate analysis comprises determining a relationship between the auditing data and a historical auditing data.

3. The method of claim 2, further comprising monetizing the audited digital content based upon the relationship between the auditing data and the historical auditing data.

4. The method of claim 1, further comprising receiving a monetization rule set, the monetization rule set having data used to determine the exchange basis.

5. The method of claim 1, further comprising generating metadata to be associated with the audited digital content, the metadata containing a location of a permissions party.

6. The method of claim 1, further comprising generating metadata to be associated with the audited digital content, the metadata containing a script instructing a computer system as to how to process the metadata file.

7. A computer system comprising:
- a first receiver to receive auditing data relating to a piece of digital content;
- an association engine to associate the auditing data with the piece of digital content to create audited digital content;
- a second receiver to receive a content request pertaining to the audited digital content from a requester;
- a checking engine to check, using one or more processors, a permission associated with the audited digital content, the permission to determine an exchange basis upon which the audited digital content is provided to the requester, and where the exchange basis defines the condition upon which the audited digital content is accessible;
- a histogram generator to generate a histogram based upon the auditing data;
- a peak rate engine to conduct a peak rate analysis determining a relationship between the auditing data and a historical auditing data; and
- a transmitter to transmit the audited digital content.

8. The computer system of claim 7, wherein the histogram is used, in part, to determine the exchange basis.

9. The computer system of claim 7, further comprising a monetizing engine to audit digital content based upon the relationship between the auditing data and the historical auditing data.

10. The computer system of claim 7, further comprising a third receiver to receive a monetization rule set, the monetization rule set having data used to determine the exchange basis.

11. The computer system of claim 7, further comprising a metadata engine to generate a metadata file to be associated with the audited digital content, the metadata file containing a location of a permissions party.

12. The computer system of claim 7, further comprising a metadata engine to generate a metadata file to be associated with the audited digital content, the metadata file containing a script instructing a computer system as to how to process the metadata file.

13. An apparatus comprising:
- means for receiving auditing data relating to a piece of digital content; means for associating the auditing data with the piece of digital content to create audited digital content;
- means for receiving a content request pertaining to the audited digital content from a requester;
- means for checking a permission associated with the audited digital content, the permission to determine an exchange basis upon which the audited digital content is provided to the requester, and where the exchange basis defines the condition upon which the audited digital content is accessible;
- means for generating a histogram based upon the auditing data, the histogram used, in part, to determine the exchange basis;
- means for conducting a peak rate analysis; and
- means for providing the audited digital content to the requester according to the exchange basis.

14. A machine-readable storage medium comprising instructions, which when implemented by one or more machines cause the one or more machines to perform the following operations comprising:
- receiving auditing data relating to a piece of digital content;
- associating, using one or more processors, the auditing data with the piece of digital content to create audited digital content;
- receiving a content request pertaining to the audited digital content from a requester;
- checking a permission associated with the audited digital content, the permission to determine an exchange basis upon which the audited digital content is provided to the requester, and where the exchange basis defines the condition upon which the audited digital content is accessible;
- generating a histogram based upon the auditing data;
- conducting a peak rate analysis determining a relationship between the auditing data and a historical auditing data; and
- providing the audited digital content to the requester according to the exchange basis.

* * * * *